United States Patent
Hong

(10) Patent No.: US 11,902,815 B2
(45) Date of Patent: Feb. 13, 2024

(54) METHOD FOR COMMUNICATING THROUGH NON-TERRESTRIAL NETWORK, AND APPARATUS THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 331 days.

(21) Appl. No.: 17/420,999

(22) PCT Filed: Dec. 30, 2019

(86) PCT No.: PCT/KR2019/018700
§ 371 (c)(1),
(2) Date: Jul. 6, 2021

(87) PCT Pub. No.: WO2020/145559
PCT Pub. Date: Jul. 16, 2020

(65) Prior Publication Data
US 2022/0086671 A1    Mar. 17, 2022

(30) Foreign Application Priority Data

Jan. 8, 2019  (KR) .................. 10-2019-0002043
Dec. 27, 2019 (KR) .................. 10-2019-0176309

(51) Int. Cl.
*H04W 24/10*    (2009.01)
*H04W 84/06*    (2009.01)

(52) U.S. Cl.
CPC ............ *H04W 24/10* (2013.01); *H04W 84/06* (2013.01)

(58) Field of Classification Search
CPC .............................. H04W 84/06; H04W 24/10
See application file for complete search history.

(56) References Cited

U.S. PATENT DOCUMENTS 8,532,652 B1 *  9/2013  Edara ................ H04W 12/08
                                                 455/435.2
2009/0005031 A1  1/2009  Van Lieshout et al.
(Continued)

FOREIGN PATENT DOCUMENTS

KR    10-2008-0114589 A    12/2008
WO    2018/203261 A1       11/2018

OTHER PUBLICATIONS

LG Electronics Inc., "Signalling Delay in NTN", R2-1818333, 3GPP TSG-RAN WG2 Meeting #104, Spokane, USA, Nov. 12-16, 2018, pp. 1-3.

(Continued)

*Primary Examiner* — Ajay Cattungal
(74) *Attorney, Agent, or Firm* — IP Legal Services, LLC

(57) ABSTRACT

Disclosed is a technique for enabling a terminal and a base station to communicate through a non-terrestrial network. A method of a terminal for communicating through a non-terrestrial network (NTN) includes the steps of: receiving, from a base station, configuration information for controlling cell measurement or cell measurement reporting in the NTN; determining whether to perform cell measurement or cell measurement reporting by using the configuration information; and controlling a cell measurement or cell measurement reporting operation according to the determination result.

18 Claims, 19 Drawing Sheets

(56) References Cited

U.S. PATENT DOCUMENTS

| | | |
|---|---|---|
| 2010/0190488 A1 | 7/2010 | Jung et al. |
| 2012/0231794 A1 | 9/2012 | Van Lieshout et al. |
| 2014/0269353 A1* | 9/2014 | Yang .................. H04W 24/10 |
| | | 370/252 |
| 2014/0357197 A1 | 12/2014 | Jung et al. |
| 2015/0077269 A1* | 3/2015 | Hua .................... G08C 17/02 |
| | | 340/870.16 |
| 2016/0323032 A1 | 11/2016 | Ulupinar et al. |
| 2016/0323800 A1 | 11/2016 | Ulupinar et al. |
| 2017/0230104 A1 | 8/2017 | Purkayastha et al. |
| 2020/0162939 A1* | 5/2020 | Kim ..................... H04B 7/0617 |
| 2020/0187035 A1 | 6/2020 | Maattanen |
| 2020/0213891 A1* | 7/2020 | Hong ................ H04W 36/0061 |
| 2020/0314673 A1* | 10/2020 | Deogun .............. H04B 7/0632 |
| 2021/0083760 A1* | 3/2021 | Schmidt ............... H04W 36/30 |
| 2022/0248308 A1* | 8/2022 | Chen ................ H04W 52/0216 |
| 2022/0353714 A1* | 11/2022 | Fu ..................... H04W 56/0015 |

OTHER PUBLICATIONS

LG Electronics Inc., "Considerations on RRC connection handling in NTN", R2-1816442, 3GPP TSG-RAN WG2 Meeting #104, Spokane, U.S., Nov. 12-16, 2018, pp. 1-5.

Fraunhofer Iis et al., "NR-NTN: HARQ in Satellite Systems", R2-1817757, 3GPP TSG-RAN WG2 Meeting #104, Spokane, USA, Nov. 12-16, 2018, pp. 1-4.

CATT, "Mobility Issue for NTN System", R2-1816281, 3GPP TSG-RAN WG2 Meeting #104, Spokane, USA, Nov. 12-16, 2018, pp. 1-4.

European Patent Office, European Search Report of corresponding EP Patent Application No. 19908873.3, dated Aug. 18, 2022.

European Patent Office, Office Action of corresponding EP Patent Application No. 19908873.3, dated Jul. 6, 2023.

* cited by examiner

FIG. 11

| Platforms | Altitude range | Orbit | Typical beam footprint size |
|---|---|---|---|
| Low-Earth Orbit (LEO) satellite | 300 – 1500 km | Circular around the earth | 100 – 500 km |
| Medium-Earth Orbit (MEO) satellite | 7000 – 25000 km | | 100 – 500 km |
| Geostationary Earth Orbit (GEO) satellite | 35 786 km | notional station keeping position fixed in terms of elevation/azimuth with respect to a given earth point | 200 – 1000 km |
| UAS platform (including HAPS) | 8 – 50 km (20 km for HAPS) | | 5 – 200 km |
| High Elliptical Orbit (HEO) satellite | 400 – 50000 km | Elliptical around the earth | 200 – 1000 km |

FIG.15

| Epoch (day, hr, min, sec) | X[km] | Y[km] | Z[km] | dX/dt[km/s] | dY/dt[km.s] | dZ/dt[km/s] |
|---|---|---|---|---|---|---|
| 2018-12-26 02:00:00 | 19151.529 | -37578.251 | 17.682 | -0.00151 | -0.00102 | -0.00106 |
| 2018-12-26 02:05:00 | 19151.1073 | -37578.556 | 17.359 | -0.00152 | -0.00101 | -0.00109 |
| 2018-12-26 02:10:00 | 19150.614 | -37578.855 | 17.029 | -0.00154 | -0.00099 | -0.00112 |
| 2018-12-26 02:15:00 | 19150.150 | -37579.151 | 16.690 | -0.00155 | -0.00098 | -0.00114 |

FIG.16

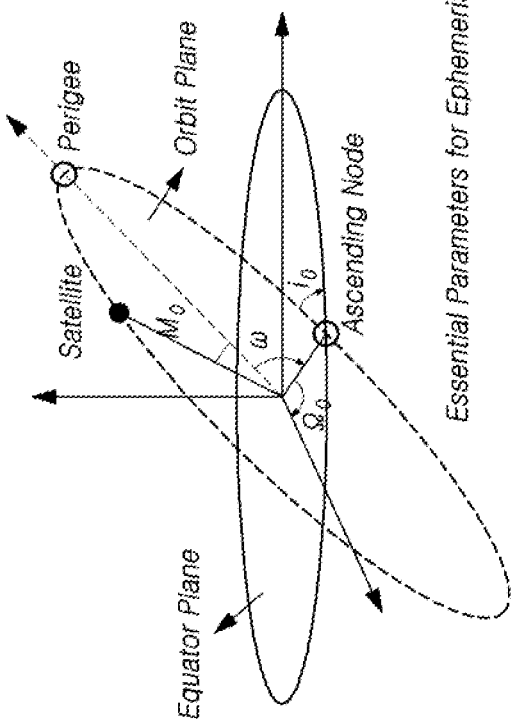

| | | Essential Parameters for Ephemeris |
|---|---|---|
| Orbital plane parameters | $\sqrt{a}$ | Square root of semi major axis (semi-major axis) |
| | $e$ | Eccentricity (eccentricity) |
| | $i_0$ | Inclination angle at reference time (inclination) |
| | $\Omega_0$ | Longitude of ascending node of orbit plane (right ascension of the ascending node) |
| | $\omega$ | Argument of perigee (argument of periapsis) |
| Satellite level parameters | $M_0$ | Mean anomaly at reference time (true anomaly and a reference point in time) |
| | $t_{0e}$ | Ephemeris reference time (the epoch) |

METHOD FOR COMMUNICATING THROUGH NON-TERRESTRIAL NETWORK, AND APPARATUS THEREFOR

CROSS REFERENCE TO RELATED APPLICATIONS

This application is a National Stage Patent Application of PCT International Patent Application No. PCT/KR2019/018700 (filed on Dec. 30, 2019) under 35 U.S.C. § 371, which claims priority to Korean Patent Application Nos. 10-2019-0002043 (filed on Jan. 8, 2019) and 10-2019-0176309 (filed on Dec. 27, 2019), the teachings of which are incorporated herein in their entireties by reference.

TECHNICAL FIELD

The disclosure relates techniques for performing communication using a non-terrestrial network between a user equipment (UE) and a base station.

BACKGROUND ART

The amount of data transmission and reception using wireless communication technology is increasing rapidly according to the increase in the spread of cellular phones and the like, and various types of wireless communication devices are introduced. In addition, as the importance of low latency is highlighted, development of a next-generation wireless communication technology (New RAT) after LTE technology is in progress.

In addition, the number of terminals (e.g., UEs) performing communication using the wireless communication technology is increasing abruptly, and there is a large demand for communication in various environments and locations. In this situation, it is necessary to provide a communication service with a further wider coverage and even in an environment where a base station connected by wire may not be established.

To this end, many researches have been conducted on non-terrestrial networks that are wirelessly linked to core networks in the air, not base stations built on the ground. The non-terrestrial network refers to a network or segment of a network that uses airborne vehicles such as HAPS (High Altitude Platform) or spaceborne vehicles such as satellites for transmission.

In addition, in next-generation wireless communication technology, in order to provide a more efficient communication service to a terminal, a beam-related technology is applied. However, in a non-terrestrial network, the distance between the terminal and the base station (e.g., network node, such as a satellite) is very long, and multiple beam-related technologies are applied. Accordingly, unnecessary delay may occur in cell measurement and cell measurement report. Therefore, it is required to define a separate protocol for cell measurement in the non-terrestrial network.

DETAILED DESCRIPTION OF THE INVENTION

Technical Problem

The embodiments provide a method and an apparatus to perform communication using a non-terrestrial network between a user equipment (UE) and a base station.

Technical Solution

According to an embodiment of the disclosure, a method may be provided for performing communication using a non-terrestrial network by the user equipment (UE). The method may include receiving configuration information for controlling a cell measurement or a cell measurement report in the non-terrestrial network from a base station, determining whether to perform the cell measurement or the cell measurement report by using the configuration information and controlling the cell measurement or the cell measurement report operation according to the determination result.

According to an embodiment of the disclosure, a method may be provided for performing communication using a non-terrestrial network by a base station. The method may include transmitting configuration information for controlling a cell measurement or a cell measurement report in the non-terrestrial network to a base station, and receiving the cell measurement report operation according to the determination result in which the UE determines whether to perform the cell measurement or the cell measurement report by using the configuration information.

According to an embodiment of the disclosure, a UE may be provided for performing communication using a non-terrestrial network. The UE may include a receiver configured to receive configuration information for controlling a cell measurement or a cell measurement report in the non-terrestrial network from a base station, and a controller configured to determine whether to perform the cell measurement or the cell measurement report by using the configuration information and control the cell measurement or the cell measurement report operation according to the determination result.

According to an embodiment of the disclosure, a base station may be provided for performing communication using a non-terrestrial network. The base station may include a transmitter configured to transmit configuration information for controlling a cell measurement or a cell measurement report in the non-terrestrial network to a base station, and a receiver configured to receive the cell measurement report operation according to the determination result in which the UE determines whether to perform the cell measurement or the cell measurement report by using the configuration information.

Advantageous Effects

The embodiments may provide the method and the apparatus to perform communication using a non-terrestrial network between a user equipment (UE) and a base station.

BRIEF DESCRIPTION OF DRAWINGS

FIG. 11 is types of NTN platform.

FIG. 15 is illustrates satellite orbit information according to an embodiment.

FIG. 16 is illustrates a parameter value of satellite orbit information according to an embodiment.

MODE FOR CARRYING OUT THE INVENTION

Figure 1:
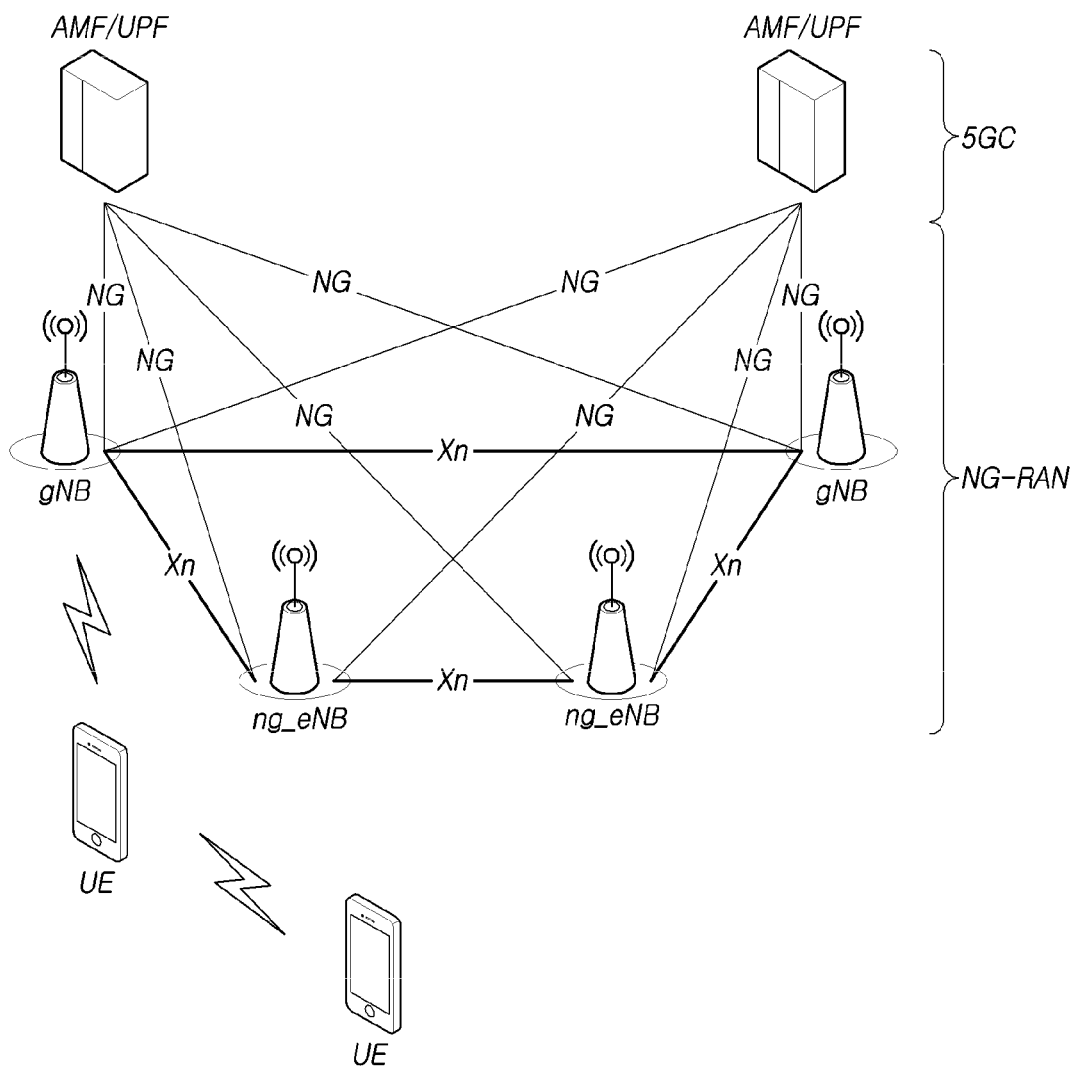
FIG. 1 is a view schematically illustrating an NR wireless communication system in accordance with embodiments of the disclosure.

Hereinafter, some embodiments of the disclosure will be described in detail with reference to the accompanying illustrative drawings. In the drawings, like reference numerals are used to denote like elements throughout the drawings, even if they are shown on different drawings. Further, in the following description of the disclosure, a detailed description of known functions and configurations incorporated herein will be omitted when it may make the subject matter of the disclosure rather unclear. When the expression "include", "have", "comprise", or the like as mentioned herein is used, any other part may be added unless the expression "only" is used. When an element is expressed in the singular, the element may cover the plural form unless a special mention is explicitly made of the element.

In addition, terms, such as first, second, A, B, (A), (B) or the like may be used herein when describing components of the disclosure. Each of these terminologies is not used to define an essence, order or sequence of a corresponding component but used merely to distinguish the corresponding component from other component(s).

In describing the positional relationship between components, if two or more components are described as being "connected", "combined", or "coupled" to each other, it should be understood that two or more components may be directly "connected", "combined", or "coupled" to each other, and that two or more components may be "connected", "combined", or "coupled" to each other with another component "interposed" therebetween. In this case, another component may be included in at least one of the two or more components that are "connected", "combined", or "coupled" to each other.

In the description of a sequence of operating methods or manufacturing methods, for example, the expressions using "after", "subsequent to", "next", "before", and the like may also encompass the case in which operations or processes are performed discontinuously unless "immediately" or "directly" is used in the expression.

Numerical values for components or information corresponding thereto (e.g., levels or the like), which are mentioned herein, may be interpreted as including an error range caused by various factors (e.g., process factors, internal or external impacts, noise, etc.) even if an explicit description thereof is not provided.

The wireless communication system in the present specification refers to a system for providing various communication services, such as a voice service and a data service, using radio resources. The wireless communication system may include a user equipment (UE), a base station, a core network, and the like.

Embodiments disclosed below may be applied to a wireless communication system using various radio access technologies. For example, the embodiments may be applied to various radio access technologies such as code division multiple access (CDMA), frequency division multiple access (FDMA), time division multiple access (TDMA), orthogonal frequency division multiple access (OFDMA), single-carrier frequency division multiple access (SC-FDMA), non-orthogonal multiple access (NOMA), or the like. In addition, the radio access technology may refer to respective generation communication technologies established by various communication organizations, such as 3GPP, 3GPP2, WiFi, Bluetooth, IEEE, ITU, or the like, as well as a specific access technology. For example, CDMA may be implemented as a wireless technology such as universal terrestrial radio access (UTRA) or CDMA2000. TDMA may be implemented as a wireless technology such as global system for mobile communications (GSM)/general packet radio service (GPRS)/enhanced data rates for GSM evolution (EDGE). OFDMA may be implemented as a wireless technology such as IEEE (Institute of Electrical and Electronics Engineers) 802.11 (Wi-Fi), IEEE 802.16 (WiMAX), IEEE 802-20, evolved UTRA (E-UTRA), and the like. IEEE 802.16m is evolution of IEEE 802.16e, which provides backward compatibility with systems based on IEEE 802.16e. UTRA is a part of a universal mobile telecommunications system (UMTS). 3GPP (3rd-generation partnership project) LTE (long-term evolution) is a part of E-UMTS (evolved UMTS) using evolved-UMTS terrestrial radio access (E-UTRA), which adopts OFDMA in a downlink and SC-FDMA in an uplink. As described above, the embodiments may be applied to radio access technologies that have been launched or commercialized, and may be applied to radio access technologies that are being developed or will be developed in the future.

The UE used in the specification must be interpreted as a broad meaning that indicates a device including a wireless communication module that communicates with a base station in a wireless communication system. For example, the UE includes user equipment (UE) in WCDMA, LTE, NR, HSPA, IMT-2020 (5G or New Radio), and the like, a mobile station in GSM, a user terminal (UT), a subscriber station (SS), a wireless device, and the like. In addition, the UE may be a portable user device, such as a smart phone, or may be a vehicle, a device including a wireless communication module in the vehicle, and the like in a V2X communication system according to the usage type thereof. In the case of a machine-type communication (MTC) system, the UE may refer to an MTC terminal, an M2M terminal, or a URLLC terminal, which employs a communication module capable of performing machine-type communication.

A base station or a cell in the present specification refers to an end that communicates with a UE through a network and encompasses various coverage regions such as a Node-B, an evolved Node-B (eNB), a gNode-B, a low-power node (LPN), a sector, a site, various types of antennas, a base transceiver system (BTS), an access point, a point (e.g., a transmission point, a reception point, or a transmission/ reception point), a relay node, a megacell, a macrocell, a microcell, a picocell, a femtocell, a remote radio head (RRH), a radio unit (RU), a small cell, and the like. In addition, the cell may be used as a meaning including a bandwidth part (BWP) in the frequency domain. For example, the serving cell may refer to an active BWP of a UE.

The various cells listed above are provided with a base station controlling one or more cells, and the base station may be interpreted as two meanings. The base station may be 1) a device for providing a megacell, a macrocell, a microcell, a picocell, a femtocell, or a small cell in connection with a wireless region, or the base station may be 2) a wireless region itself. In the above description 1), the base station may be the devices controlled by the same entity and providing predetermined wireless regions or all devices interacting with each other and cooperatively configuring a wireless region. For example, the base station may be a point, a transmission/reception point, a transmission point, a reception point, and the like according to the configuration method of the wireless region. In the above description 2), the base station may be the wireless region in which a user equipment (UE) may be enabled to transmit data to and receive data from the other UE or a neighboring base station.

In this specification, the cell may refer to coverage of a signal transmitted from a transmission/reception point, a component carrier having coverage of a signal transmitted from a transmission/reception point (or a transmission point), or a transmission/reception point itself.

An uplink (UL) refers to a scheme of transmitting data from a UE to a base station, and a downlink (DL) refers to a scheme of transmitting data from a base station to a UE. The downlink may mean communication or communication paths from multiple transmission/reception points to a UE, and the uplink may mean communication or communication paths from a UE to multiple transmission/reception points. In the downlink, a transmitter may be a part of the multiple transmission/reception points, and a receiver may be a part of the UE. In addition, in the uplink, the transmitter may be a part of the UE, and the receiver may be a part of the multiple transmission/reception points.

The uplink and downlink transmit and receive control information over a control channel, such as a physical downlink control channel (PDCCH) and a physical uplink control channel (PUCCH). The uplink and downlink transmit and receive data over a data channel such as a physical downlink shared channel (PDSCH) and a physical uplink shared channel (PUSCH). Hereinafter, the transmission and reception of a signal over a channel, such as PUCCH, PUSCH, PDCCH, PDSCH, or the like, may be expressed as "PUCCH, PUSCH, PDCCH, PDSCH, or the like is transmitted and received".

For the sake of clarity, the following description will focus on 3GPP LTE/LTE-A/NR (New Radio) communication systems, but technical features of the disclosure are not limited to the corresponding communication systems.

3GPP has been developing a 5G (5th-Generation) communication technology in order to meet the requirements of a next-generation radio access technology of ITU-R after studying 4G (4th-generation) communication technology. Specifically, 3GPP is developing, as a 5G communication technology, LTE-A pro by improving the LTE-Advanced technology so as to conform to the requirements of ITU-R and a new NR communication technology that is totally different from 4G communication technology. LTE-A pro and NR all refer to the 5G communication technology.

Hereinafter, the 5G communication technology will be described on the basis of NR unless a specific communication technology is specified.

Various operating scenarios have been defined in NR in consideration of satellites, automobiles, new verticals, and the like in the typical 4G LTE scenarios so as to support an enhanced mobile broadband (eMBB) scenario in terms of services, a massive machine-type communication (mMTC) scenario in which UEs spread over a broad region at a high UE density, thereby requiring low data rates and asynchronous connections, and an ultra-reliability and low-latency (URLLC) scenario that requires high responsiveness and reliability and supports high-speed mobility.

In order to satisfy such scenarios, NR introduces a wireless communication system employing a new waveform and frame structure technology, a low-latency technology, a super-high frequency band (mmWave) support technology, and a forward compatible provision technology. In particular, the NR system has various technological changes in terms of flexibility in order to provide forward compatibility. The primary technical features of NR will be described below with reference to the drawings.

<Overview of NR System>

FIG. 1 is a view schematically illustrating an NR system.

Referring to FIG. 1, the NR system is divided into a 5G core network (5GC) and an NG-RAN part. The NG-RAN includes gNBs and ng-eNBs providing user plane (SDAP/PDCP/RLC/MAC/PHY) and user equipment (UE) control plane (RRC) protocol ends. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing a control plane, such as a UE connection and mobility control function, and a user plane function (UPF) controlling user data. NR supports both frequency bands below 6 GHz (frequency range 1 FR1 FR1) and frequency bands equal to or greater than 6 GHz (frequency range 2 FR2).

The gNB denotes a base station that provides a UE with an NR user plane and control plane protocol end. The ng-eNB denotes a base station that provides a UE with an E-UTRA user plane and control plane protocol end. The base station described in the present specification should be understood as encompassing the gNB and the ng-eNB. However, the base station may be also used to refer to the gNB or the ng-eNB separately from each other, as necessary.

<NR Waveform, Numerology, and Frame Structure>

NR uses a CP-OFDM waveform using a cyclic prefix for downlink transmission and uses CP-OFDM or DFT-s-OFDM for uplink transmission. The OFDM technology is easy to combine with a multiple-input multiple-output (MIMO) scheme and allows a low-complexity receiver to be used with high frequency efficiency.

Since the three scenarios described above have different requirements for data rates, delay rates, coverage, and the like from each other in NR, it is necessary to efficiently satisfy the requirements for each scenario over frequency bands constituting the NR system. To this end, a technique for efficiently multiplexing radio resources based on a plurality of different numerologies has been proposed.

Specifically, the NR transmission numerology is determined on the basis of subcarrier spacing and a cyclic prefix (CP). As shown in Table 1 below, "$\mu$" is used as an exponential value of 2 so as to be changed exponentially on the basis of 15 kHz.

TABLE 1

| μ | Subcarrier spacing | Cyclic prefix | Supported for data | Supported for synch |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Figure 2:
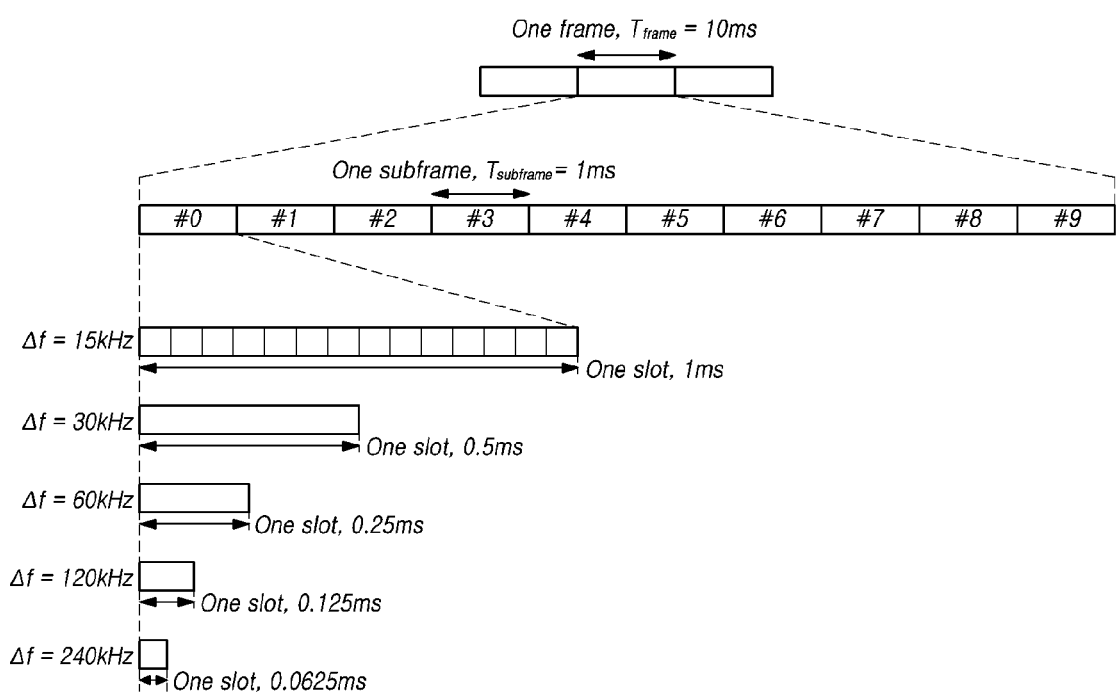
FIG. 2 is a view schematically illustrating a frame structure in an NR system in accordance with embodiments of the disclosure.

As shown in Table 1 above, NR may have five types of numerologies according to subcarrier spacing. This is different from LTE, which is one of the 4G-communication technologies, in which the subcarrier spacing is fixed to 15 kHz. Specifically, in NR, subcarrier spacing used for data transmission is 15, 30, 60, or 120 kHz, and subcarrier spacing used for synchronization signal transmission is 15, 30, 120, or 240 kHz. In addition, an extended CP is applied only to the subcarrier spacing of 60 kHz. In NR, a frame is defined to include 10 subframes each having the same length of 1 ms and have a length of 10 ms. One frame may be divided into half frames of 5 ms, and each half frame includes 5 subframes. In the case of a subcarrier spacing of 15 kHz, one subframe includes one slot, and each slot includes 14 OFDM symbols. FIG. 2 is a view for explaining a frame structure in an NR system. Referring to FIG. 2, a slot includes 14 OFDM symbols, which are fixed, in the case of a normal CP, but the length of the slot in the time domain may be varied depending on subcarrier spacing. For example, in the case of a numerology having a subcarrier spacing of 15 kHz, the slot is configured to have the same length of 1 ms as that of the subframe. On the other hand, in the case of a numerology having a subcarrier spacing of 30 kHz, the slot includes 14 OFDM symbols, but one subframe may include two slots each having a length of 0.5 ms. That is, the subframe and the frame may be defined using a fixed time length, and the slot may be defined as the number of symbols such that the time length thereof is varied depending on the subcarrier spacing. NR defines a basic unit of scheduling as a slot and also introduces a minislot (or a subslot or a non-slot-based schedule) in order to reduce a transmission delay of a radio section. If wide subcarrier spacing is used, the length of one slot is shortened in inverse proportion thereto, thereby reducing a transmission delay in the radio section. A minislot (or subslot) is intended to efficiently support URLLC scenarios, and the minislot may be scheduled in 2, 4, or 7 symbol units.

In addition, unlike LTE, NR defines uplink and downlink resource allocation as a symbol level in one slot. In order to reduce a HARQ delay, the slot structure capable of directly transmitting HARQ ACK/NACK in a transmission slot has been defined. Such a slot structure is referred to as a "self-contained structure", which will be described.

NR was designed to support a total of 256 slot formats, and 62 slot formats thereof are used in 3GPP Rel-15. In addition, NR supports a common frame structure constituting an FDD or TDD frame through combinations of various slots. For example, NR supports i) a slot structure in which all symbols of a slot are configured for a downlink, ii) a slot structure in which all symbols are configured for an uplink, and iii) a slot structure in which downlink symbols and uplink symbols are mixed. In addition, NR supports data transmission that is scheduled to be distributed to one or more slots. Accordingly, the base station may inform the UE of whether the slot is a downlink slot, an uplink slot, or a flexible slot using a slot format indicator (SFI). The base station may inform a slot format by indicating, using the SFI, the index of a table configured through UE-specific RRC signaling. Further, the base station may dynamically indicate the slot format through downlink control information (DCI) or may statically or quasi-statically indicate the same through RRC signaling.

<Physical Resources of NR>

With regard to physical resources in NR, antenna ports, resource grids, resource elements, resource blocks, bandwidth parts, and the like are taken into consideration.

The antenna port is defined to infer a channel carrying a symbol on an antenna port from the other channel carrying another symbol on the same antenna port. If large-scale properties of a channel carrying a symbol on an antenna port can be inferred from the other channel carrying a symbol on another antenna port, the two antenna ports may have a quasi-co-located or quasi-co-location (QC/QCL) relationship. The large-scale properties include at least one of delay spread, Doppler spread, a frequency shift, an average received power, and a received timing.

Figure 3:
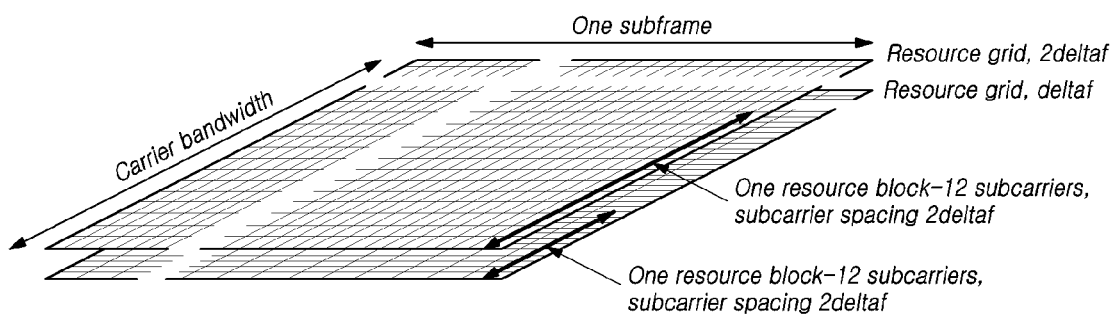
FIG. 3 is a view for explaining resource grids supported by a radio access technology in accordance with embodiments of the disclosure.

FIG. 3 illustrates resource grids supported by a radio access technology in accordance with embodiments of the disclosure.

Referring to FIG. 3, resource grids may exist according to respective numerologies because NR supports a plurality of numerologies in the same carrier. In addition, the resource grids may exist depending on antenna ports, subcarrier spacing, and transmission directions.

A resource block includes 12 subcarriers and is defined only in the frequency domain. In addition, a resource element includes one OFDM symbol and one subcarrier. Therefore, as shown in FIG. 3, the size of one resource block may be varied according to the subcarrier spacing. Further, "Point A" that acts as a common reference point for the resource block grids, a common resource block, and a virtual resource block are defined in NR.

Figure 4:
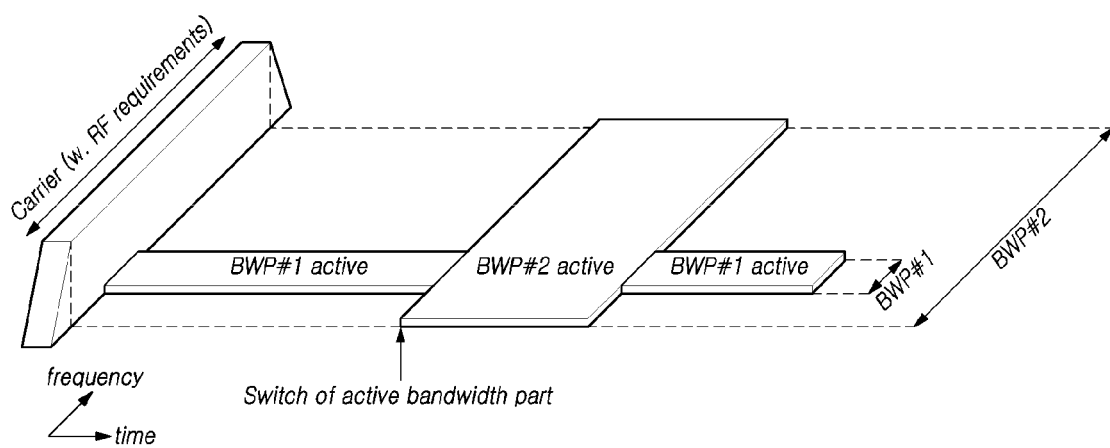
FIG. 4 is a view for explaining bandwidth parts supported by a radio access technology in accordance with embodiments of the disclosure.

FIG. 4 illustrates bandwidth parts supported by a radio access technology in accordance with embodiments of the disclosure.

Unlike LTE in which the carrier bandwidth is fixed to 20 MHz, the maximum carrier bandwidth is configured as 50 MHz to 400 MHz depending on the subcarrier spacing in NR. Therefore, it is not assumed that all UEs use the entire carrier bandwidth. Accordingly, as shown in FIG. 4, bandwidth parts (BWPs) may be specified within the carrier bandwidth in NR so that the UE may use the same. In addition, the bandwidth part may be associated with one numerology, may include a subset of consecutive common resource blocks, and may be activated dynamically over time. The UE has up to four bandwidth parts in each of the uplink and the downlink. The UE transmits and receives data using an activated bandwidth part during a given time.

In the case of a paired spectrum, uplink and downlink bandwidth parts are configured independently. In the case of an unpaired spectrum, in order to prevent unnecessary frequency re-tuning between a downlink operation and an uplink operation, the downlink bandwidth part and the uplink bandwidth part are configured in pairs to share a center frequency.

<Initial Access in NR>

In NR, a UE performs a cell search and a random access procedure in order to access and communicates with a base station.

The cell search is a procedure of the UE for synchronizing with a cell of a corresponding base station using a synchronization signal block (SSB) transmitted from the base station and acquiring a physical-layer cell ID and system information.

Figure 5:
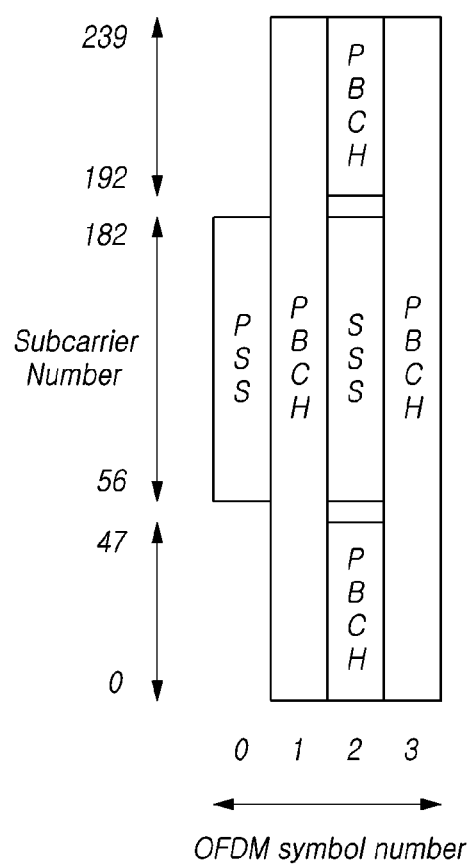
FIG. 5 is a view illustrating an example of a synchronization signal block in a radio access technology in accordance with embodiments of the disclosure.

FIG. 5 illustrates an example of a synchronization signal block in a radio access technology in accordance with embodiments of the disclosure.

Referring to FIG. 5, the SSB includes a primary synchronization signal (PSS) and a secondary synchronization signal (SSS), which occupy one symbol and 127 subcarriers, and PBCHs spanning three OFDM symbols and 240 subcarriers.

The UE monitors the SSB in the time and frequency domain, thereby receiving the SSB.

The SSB may be transmitted up to 64 times for 5 ms. A plurality of SSBs are transmitted by different transmission beams within a time of 5 ms, and the UE performs detection on the assumption that the SSB is transmitted every 20 ms based on a specific beam used for transmission. The number of beams that may be used for SSB transmission within 5 ms may be increased as the frequency band is increased. For example, up to 4 SSB beams may be transmitted at a frequency band of 3 GHz or less, and up to 8 SSB beams may be transmitted at a frequency band of 3 to 6 GHz. In addition, the SSBs may be transmitted using up to 64 different beams at a frequency band of 6 GHz or more.

One slot includes two SSBs, and a start symbol and the number of repetitions in the slot are determined according to subcarrier spacing as follows.

Unlike the SS in the typical LTE system, the SSB is not transmitted at the center frequency of a carrier bandwidth. That is, the SSB may also be transmitted at the frequency other than the center of the system band, and a plurality of SSBs may be transmitted in the frequency domain in the case of supporting a broadband operation. Accordingly, the UE monitors the SSB using a synchronization raster, which is a candidate frequency position for monitoring the SSB. A carrier raster and a synchronization raster, which are the center frequency position information of the channel for the initial connection, were newly defined in NR, and the synchronization raster may support a fast SSB search of the UE because the frequency spacing thereof is configured to be wider than that of the carrier raster.

The UE may acquire an MIB over the PBCH of the SSB. The MIB (master information block) includes minimum information for the UE to receive remaining minimum system information (RMSI) broadcast by the network. In addition, the PBCH may include information on the position of the first DM-RS symbol in the time domain, information for the UE to monitor SIB1 (e.g., SIB1 numerology information, information related to SIB1 CORESET, search space information, PDCCH-related parameter information, etc.), offset information between the common resource block and the SSB (the position of an absolute SSB in the carrier is transmitted via SIB1), and the like. The SIB1 numerology information is also applied to some messages used in the random access procedure for the UE to access the base station after completing the cell search procedure. For example, the numerology information of SIB1 may be applied to at least one of the messages 1 to 4 for the random access procedure.

The above-mentioned RMSI may mean SIB1 (system information block 1), and SIB1 is broadcast periodically (e.g., 160 ms) in the cell. SIB1 includes information necessary for the UE to perform the initial random access procedure, and SIB1 is periodically transmitted over a PDSCH. In order to receive SIB1, the UE must receive numerology information used for the SIB1 transmission and the CORE-SET (control resource set) information used for scheduling of SIB1 over a PBCH. The UE identifies scheduling information for SIB1 using SI-RNTI in the CORESET. The UE acquires SIB1 on the PDSCH according to scheduling information. The remaining SIBs other than SIB1 may be periodically transmitted, or the remaining SIBs may be transmitted according to the request of the UE.

Figure 6:
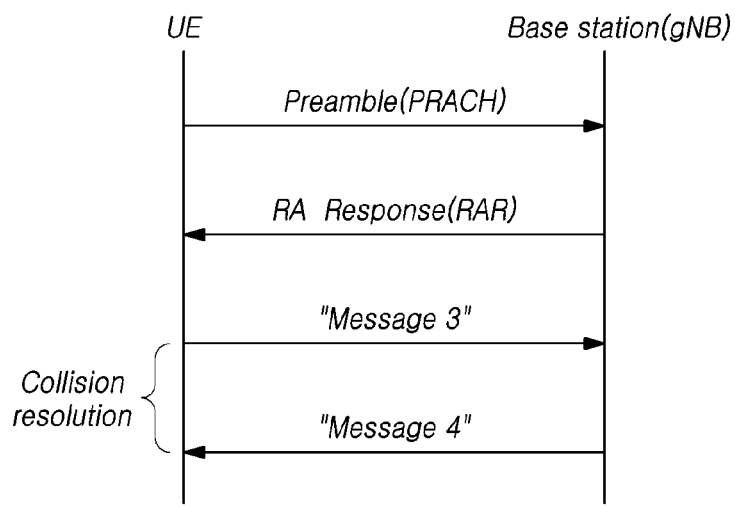
FIG. 6 is a signal diagram for explaining a random access procedure in a radio access technology in accordance with embodiments of the disclosure.

FIG. 6 is a view for explaining a random access procedure in a radio access technology.

Referring to FIG. 6, if a cell search is completed, the UE transmits a random access preamble for random access to the base station. The random access preamble is transmitted over a PRACH. Specifically, the random access preamble is periodically transmitted to the base station over the PRACH that includes consecutive radio resources in a specific slot repeated. In general, a contention-based random access procedure is performed when the UE makes initial access to a cell, and a non-contention-based random access procedure is performed when the UE performs random access for beam failure recovery (BFR).

The UE receives a random access response to the transmitted random access preamble. The random access response may include a random access preamble identifier (ID), UL Grant (uplink radio resource), a temporary C-RNTI (temporary cell-radio network temporary identifier), and a TAC (time alignment command). Since one random access response may include random access response information for one or more UEs, the random access preamble identifier may be included in order to indicate the UE for which the included UL Grant, temporary C-RNTI, and TAC are valid. The random access preamble identifier may be an identifier of the random access preamble received by the base station. The TAC may be included as information for the UE to adjust uplink synchronization. The random access response may be indicated by a random access identifier on the PDCCH, i.e., a random access-radio network temporary identifier (RA-RNTI).

Upon receiving a valid random access response, the UE processes information included in the random access response and performs scheduled transmission to the base station. For example, the UE applies the TAC and stores the temporary C-RNTI. In addition, the UE transmits, to the base station, data stored in the buffer of the UE or newly generated data using the UL Grant. In this case, information for identifying the UE must be included in the data.

Lastly, the UE receives a downlink message to resolve the contention.

<NR CORESET>

The downlink control channel in NR is transmitted in a CORESET (control resource set) having a length of 1 to 3 symbols, and the downlink control channel transmits uplink/downlink scheduling information, an SFI (slot format index), TPC (transmit power control) information, and the like.

As described above, NR has introduced the concept of CORESET in order to secure the flexibility of a system. The CORESET (control resource set) refers to a time-frequency resource for a downlink control signal. The UE may decode a control channel candidate using one or more search spaces in the CORESET time-frequency resource. CORESET-specific QCL (quasi-colocation) assumption is configured and is used for the purpose of providing information on the characteristics of analogue beam directions, as well as delay spread, Doppler spread, Doppler shift, and an average delay, which are the characteristics assumed by existing QCL.

Figure 7:
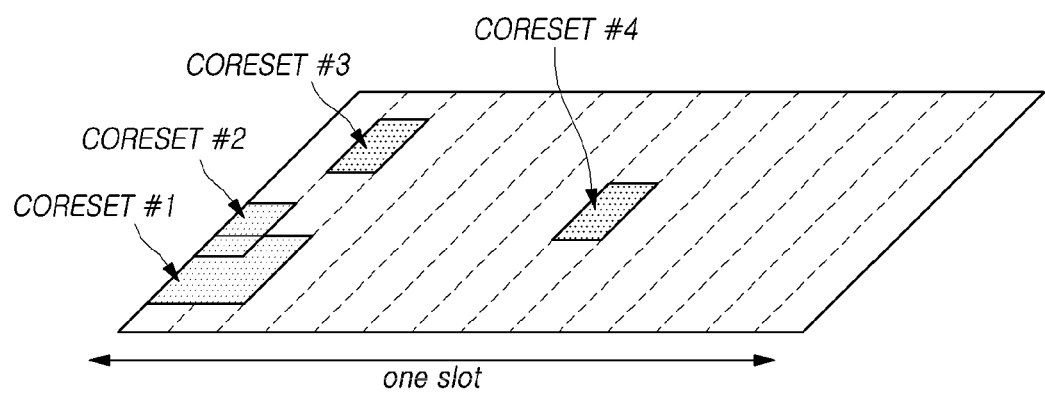
FIG. 7 is a view for explaining CORESET.

FIG. 7 illustrates CORESET.

Referring to FIG. 7, CORESETs may exist in various forms within a carrier bandwidth in a single slot, and the CORESET may include a maximum of 3 OFDM symbols in the time domain. In addition, the CORESET is defined as a multiple of six resource blocks up to the carrier bandwidth in the frequency domain.

A first CORESET, as a portion of the initial bandwidth part, is designated (e.g., indicated, assigned) through an MIB in order to receive additional configuration information and system information from a network. After establishing a connection with the base station, the UE may receive and configure one or more pieces of CORESET information through RRC signaling.

In this specification, a frequency, a frame, a subframe, a resource, a resource block, a region, a band, a subband, a control channel, a data channel, a synchronization signal, various reference signals, various signals, or various messages in relation to NR (New Radio) may be interpreted as meanings used at present or in the past or as various meanings to be used in the future.

NR (New Radio)

3GPP introduced NR, a next-generation wireless communication technology. That is, NR is radio access technology that may provide an enhanced data rate compared to LTE and may satisfy various QoS requirements required for specific and detailed usage scenarios. In particular, as a representative NR usage scenario, eMBB (enhancement Mobile Broadband), mMTC (massive MTC) and URLLC (Ultra Reliable and Low Latency Communications) have been defined. In order to meet the requirements for each scenario, it is required to design a frame structure more flexible as compared to that of LTE. The frame structure of the NR supports a frame structure based on multiple subcarriers. The basic subcarrier spacing (SCS) is 15 kHz, and a total of 5 SCS types are supported at 15 kHz*2^n.

Figure 8:
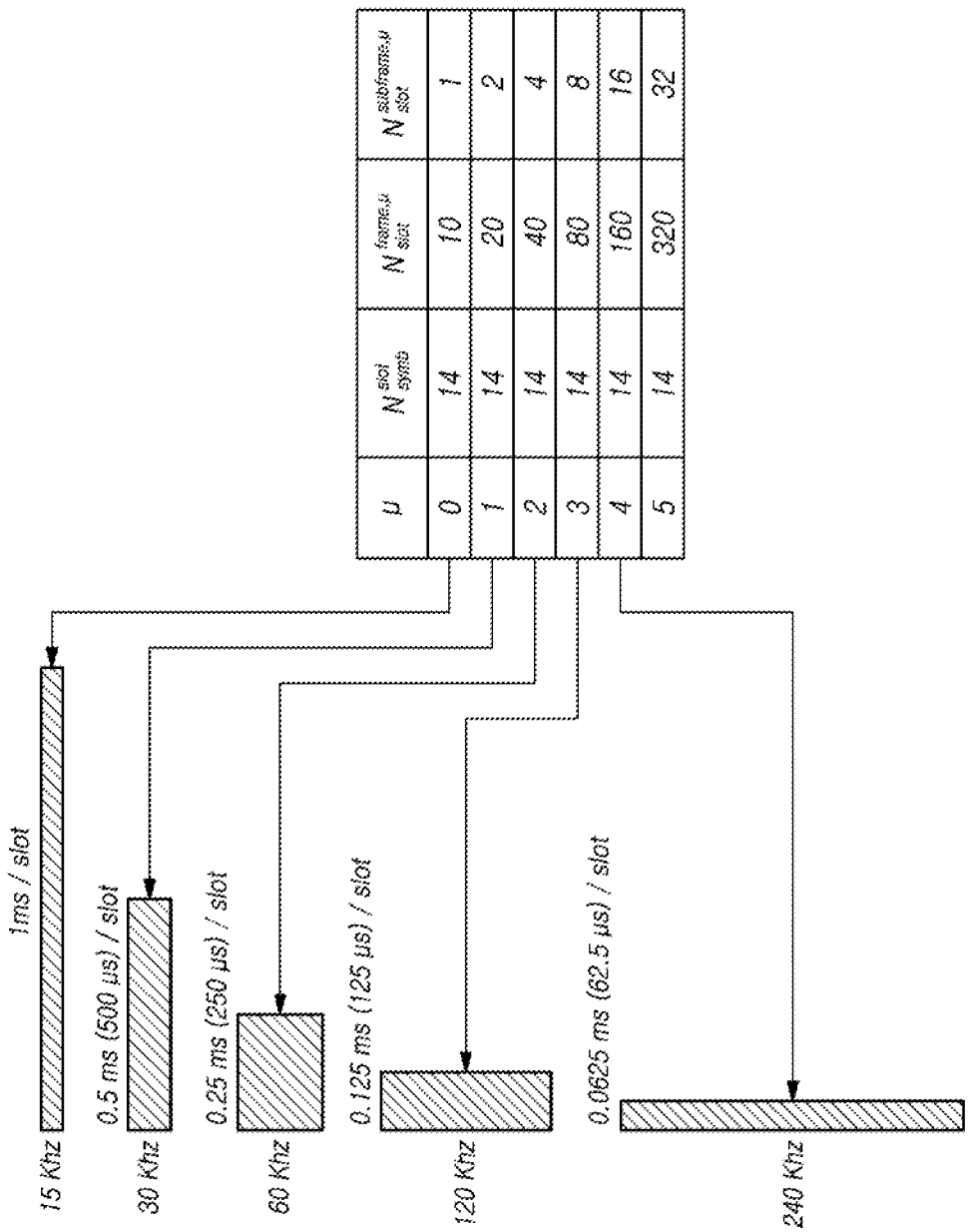
FIG. 8 is a view illustrating different subcarrier spacings arranged at a symbol level.

FIG. 8 is a view illustrating different subcarrier spacings arranged at a symbol level.

As shown in FIG. 8, the length of the time axis of the slot varies depending on the numerology. That is, the shorter the slot length, the larger the SCS. In this case, the number (y value) of OFDM symbols constituting a corresponding slot is determined to be 14 (e.g., y=14) regardless of the SCS value in the case of normal CP. Therefore, one slot is made up of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in a numerology (or SCS), a mini-slot is defined. The mini-slot is constituted of a smaller number of symbols than the typical slot described above. For minislot-based uplink/downlink data transmission/reception, a short-length time-domain scheduling interval may be configured, or a long-length time-domain scheduling interval for uplink/downlink data transmission/reception may be configured via slot aggregation. In particular, in the case of transmission and reception of latency-sensitive data, such as URLLC, it is difficult to satisfy the latency requirements if scheduling is performed in slot units which are based on 1 ms (14 symbols) as defined in the numerology-based frame structure which has a small SCS value, e.g., 15 kHz. Thus, a mini-slot is defined to be constituted of a smaller number of OFDM symbols than the slot constituted of 14 symbols. Based thereupon, scheduling capable of meeting the URLLC requirements may be carried out.

In NR, the following structure is supported on the time axis. Unlike LTE, the basic scheduling unit is changed to the above described slot in NR. Also, regardless of the subcarrier spacing, a slot made up of 14 OFDM symbols. On the other hand, it supports a non-slot structure (mini-slot structure) composed of 2, 4, and 7 OFDM symbols, which are smaller scheduling units. The non-slot structure may be used as a scheduling unit for URLLC service.

Radio frame: Fixed 10 ms regardless of the numerology.

Subframe: Fixed 1 ms as a reference for time duration. It is not used for data/control scheduling unit, different from the LTE.

Slot: Mainly used for eMBB. It includes 14 OFDM symbols.

Non-slot (i.e. mini-slot): Mainly used for URLLC, but not limited to URLLC only. It includes 2, 4, or 7 OFDM symbols.

One TTI duration: A Time duration for data/control channel transmission. A number of OFDM symbols per a slot/non-slot in the time main.

<NR MIMO and Beam Management>

NR includes a beam management-related technology, an analog beamforming evolution technology and develops a MIMO codebook/feedback technology included in a digital beamforming technology.

The analog beamforming may be broadly classified into a beam management-related technology for forming an optimal beam pair between a base station and a UE through a base station/UE beam sweeping transmission and beam repetition transmission, etc. and a beam failure recovery technique for forming a new beam pair.

Initial Beam Establishment

An initial beam establishment is a procedure for initially forming the optimal beam pair between the base station and the UE. Such an initial beam establishment, is performed in an initial access procedure. During the initial cell search, the UE may acquire some of the plurality of SSBs each configured with different downlink beams transmitted from the base station in time order.

The UE selects an optimal beam based on the acquired SSBs, and transmits a random access preamble associated with the optimal beam to the base station. Specifically, different SSB time indices are associated with different random access channel time/frequency occasions (RACH time/frequency occasions) and/or other preamble sequences.

When one SSB is associated with two or more random access time/frequency occasions, frequency is the highest priority, time is next in one slot, and time between two slots have the priority.

Accordingly, the base station may identify the optimal beam through the random access preamble associated with the optimal beam. As a result, the base station and the UE form the initial optimal beam pair.

Beam Adjustment

Since relatively wide beams are used in the initial beamforming, the base station and the UE perform beam adjustment to a relatively narrow beam after the initial beamforming. In addition, the beam adjustment is performed even when movement or rotation of the UE occurs.

The beam adjustment may be divided into downlink beam adjustment and uplink beam adjustment.

The downlink beam adjustment may be divided into downlink transmitter-side beam adjustment and downlink receiver-side beam adjustment.

For example, the downlink transmission-side beam adjustment will be described as an example. When the base station transmits two or more downlink signals (e.g., CSI- RS or SSB), the UE measures them and reports the results to the base station. The base station determines the optimal beam according to a report result from the UE, and the base station and the UE form the beam pair based on the optimal beam.

When the base station and the UE form the beam pair using the CSI-RS, the base station sequentially transmits two or more and up to four CSI-RSs each configured with different beams to the UE. The UE measures each CSI-RS, for example, L1-RSRP, and reports the result to the base station. The report result may include up to four CSI-RS indication information, measured L1-RSRP (measured L1-RSRP for the strong beam) of the strongest beam, the difference values between L1-RSRP of the remaining beams and L1-RSRP of the strongest beam.

Beam Indication and TCI

NR supports a beam indication function. For example, the base station notifies the UE of beams used in the PDSCH and the PDCCH using configuration information and a transmission configuration indicator (TCI).

For example, the UE may be configured with up to 64 candidate TCI states. For PDCCH beam indication, a subset of M configured candidate TCI states is allocated by the higher layer signaling, for example, RRC signaling, and the base station dynamically informs a specific TCI state by MAC signaling.

For PDSCH beam indication, when the PDCCH-PDSCH timing offset or scheduling offset included in the PDCCH is greater than N symbols, the scheduling assignment DCI (e.g., 3 bits) explicitly indicates the TCI state for PDSCH transmission. When the PDCCH-PDSCH timing offset or scheduling offset included in the PDCCH is equal to or smaller than N symbols, the UE assumes that the TCI state of the PDCCH indicated by the MAC signaling and the TCI state for PDSCH transmission are the same as described above.

NR Measurement

Figure 9:
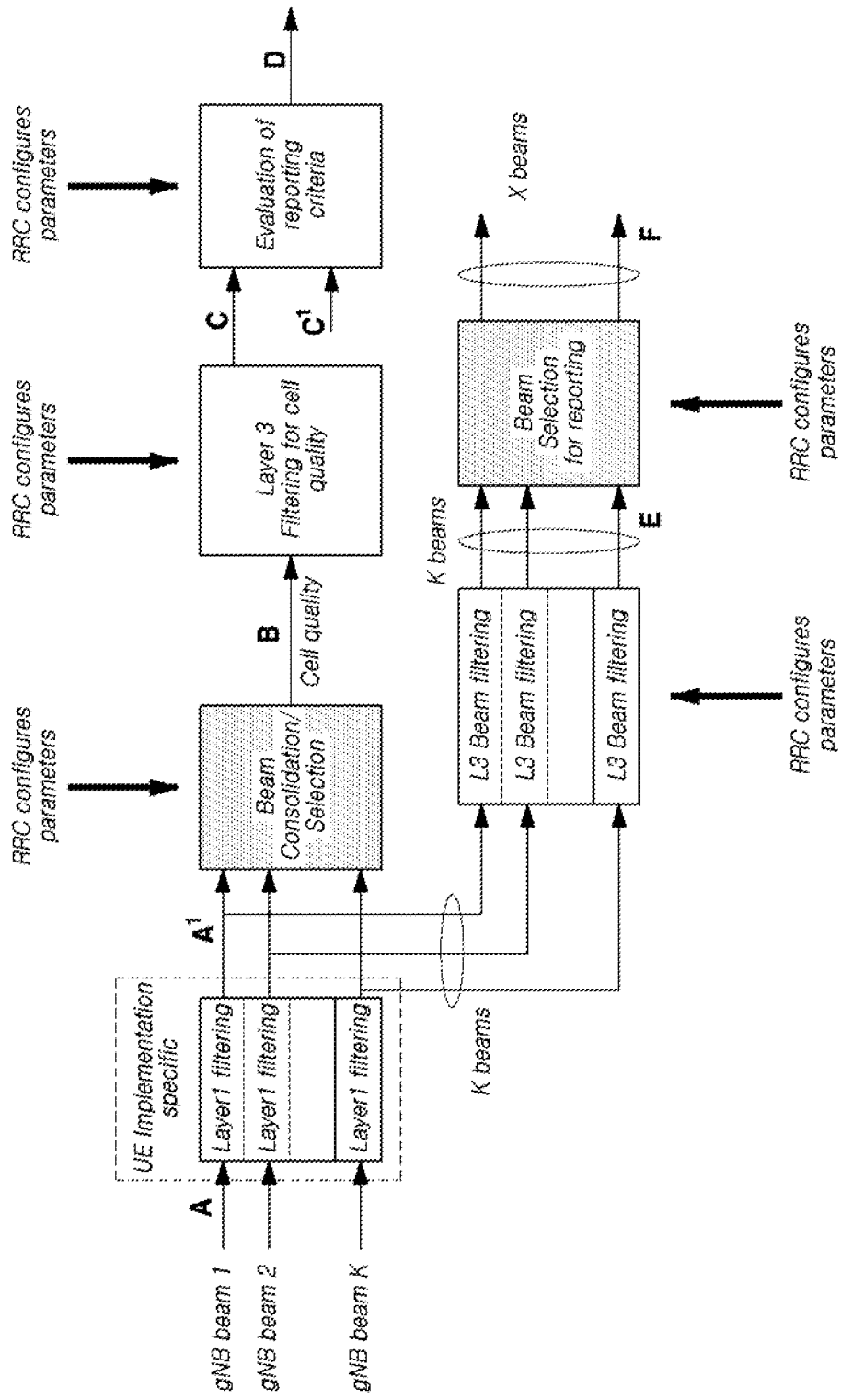
FIG. 9 illustrates a cell measurement model in NR.

FIG. 9 illustrates a cell measurement model in NR.

Referring to FIG. 9, in the RRC connection state, the UE measures multiple beams of one cell, and the measurement results are averaged to derive cell quality. By doing so, the UE is configured to consider a subset of the detected beams. Filtering occurs at two different levels. First, it occurs in the physical layer to derive the beam quality and in the RRC layer to derive the cell quality from multiple beams. The cell quality is derived in the same way from beam measurements for serving and non-serving cells. The base station may configure the UE to include the measurement result of the X best beam in the measurement report. Intra-frequency neighbor (cell) measurement and inter-frequency neighbor (cell) measurement are defined as follows.

- A measurement is defined as an SSB based intra-frequency measurement provided the center frequency of the SSB of the serving cell and the center frequency of the SSB of the neighbour cell are the same, and the subcarrier spacing of the two SSBs is also the same.
- A measurement is defined as an SSB based inter-frequency measurement provided the center frequency of the SSB of the serving cell and the center frequency of the SSB of the neighbour cell are different, or the subcarrier spacing of the two SSBs is different).
- A measurement is defined as a CSI-RS based intra-frequency measurement provided the bandwidth of the CSI-RS resource on the neighbour cell configured for measurement is within the bandwidth of the CSI-RS resource on the serving cell configured for measurement, and the subcarrier spacing of the two CSI-RS resources is the same).
- A measurement is defined as a CSI-RS based inter-frequency measurement provided the bandwidth of the CSI-RS resource on the neighbour cell configured for measurement is not within the bandwidth of the CSI-RS resource on the serving cell configured for measurement, or the subcarrier spacing of the two CSI-RS resources is different).

Non-Terrestrial Network

The non-terrestrial network refers to a network or segment of a network that uses airborne vehicles such as HAPS (High Altitude Platform) or spaceborne vehicles such as satellites for transmission.

- Spaceborne vehicles: Satellites (including Low Earth Orbiting (LEO) satellites, Medium Earth Orbiting (MEO) satellites, Geostationary Earth Orbiting (GEO) satellites as well as Highly Elliptical Orbiting (HEO) satellites).
- Airborne vehicles: High Altitude Platforms (HAPs) encompassing Unmanned Aircraft Systems (UAS) including Lighter than Air UAS (LTA), Heavier than Air UAS (HTA), all operating in altitudes typically between 8 and 50 km, quasi-stationary.

The 3GPP developed and introduced a technology that supports NR operation in the non-terrestrial network using the aforementioned satellite or air transport vehicle. However, in the non-terrestrial network, the distance between a base station and a UE is longer than that of a terrestrial network using a terrestrial base station. Accordingly, a very large round trip delay (RTD) may occur. For example, in an NTN scenario using GEO located at an altitude of 35,768 km, the RTD is known to be 544.751 ms, and in an NTN scenario using HAPS located at an altitude of 229 km, the RTD is known to be 3.053 ms. In addition, the RTD in the NTN scenario using the LEO satellite system may appear up to 25.76 ms. As described above, in order to perform a communication operation to which the NR protocol is applied in the non-terrestrial network, there is a demand of a technology for supporting the base station and the UE to perform the NR operation even under such propagation delay.

Figure 10:
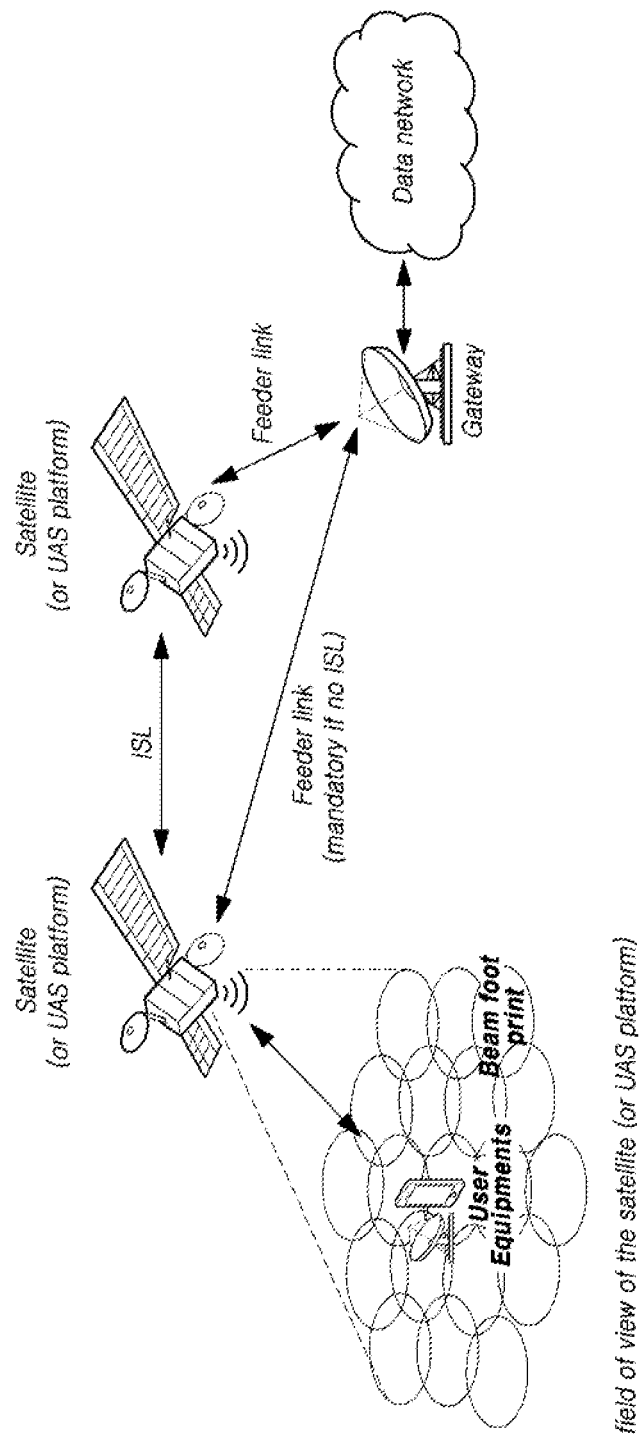
FIG. 10 illustrates an exemplary NTN scenario.

FIG. 10 exemplarily illustrates an NTN scenario to which the embodiments may be applied.

Referring to FIG. 10, the non-terrestrial network (NTN) may be implemented in various ways as follows.

- Scenario A: Transparent GEO (NTN beam foot print fixed on earth)
- Scenario B: Regenerative GEO (NTN beam foot print fixed on earth)
- Scenario C1: Transparent LEO (NTN beam foot print fixed on earth)
- Scenario C2: Transparent LEO (NTN beam foot print moving on earth)
- Scenario D1: Regenerative LEO (NTN beam foot print fixed on earth)
- Scenario D2: Regenerative LEO (NTN beam foot print moving on earth)

Here, a transparent payload or a regenerative payload is defined as follows.

- A transparent payload: Radio Frequency filtering, Frequency conversion and amplification. Hence, the waveform signal repeated by the payload is un-changed;
- A regenerative payload: Radio Frequency filtering, Frequency conversion and amplification as well as demodulation/decoding, switch and/or routing, coding/ modulation. This is effectively equivalent to having all or part of base station functions (e.g. gNB) on board the satellite (or UAS platform).

As shown in FIG. 10, the beam generated by the satellite generates multiple beams for a given service area bounded by the field of view of the satellite. In other words, the satellite (or UAS platform) generate beams typically generate several beams over a given service area bounded by its field of view. The footprint of the beam is typically elliptical.

FIG. 11 illustrates the type of NTN platform to which the embodiments may be applied.

Referring to FIG. 11, a typical beam footprint size for each type of NTN platform is shown. For example, the LEO satellite has a beam size in the range of 100-500 km, and each satellite and UAS platform may have a different beam size according to the range and orbit of the operating altitude.

Meanwhile, as in scenarios C2 and D2, when the NTN beam footprint moves on the earth, that is, when the satellite beam moves together with the satellite, it may be assumed that the linkage between the cell and the base station does not change. For example, when a satellite beam transmitted through a corresponding satellite is configured in a one-to-one connection with one PCI (Physical Cell Identifier), a cell having the corresponding PCI moves on the earth as time elapses.

For convenience of description, a beam generated from a satellite platform in the NTN is hereinafter referred to as a satellite beam. This is for convenience of description and may be replaced by any other term, and means communication coverage of a specific radius generated by a network node such as the base station of a non-terrestrial network for communication.

On the other hand, an earth fixed beam used in other scenarios means that a satellite steers a beam to a fixed point on the earth using a beamforming technique during the satellite's visibility time. As such, in the case of a steerable beam, even if the satellite moves, the footprint of the satellite beam may be fixed on the earth for a predetermined time.

In the case of the satellite beam moving across the earth together with the satellite or in the case of the earth fixed beam, the UE in the RRC connection state may have to perform handover according to the change of the satellite beam even if the UE does not move. For example, since the speed of the LEO satellite is very fast at 7.56 km/sec, the handover must be performed frequently even if the UE does not move. Therefore, for the frequent handover operation, the measurement and reporting overhead of the UE also increases.

As described, in the non-terrestrial network, the handover may be initiated according to cell change even if the UE does not move. Accordingly, such handover may increase the measurement and reporting overhead of the UE. The present disclosure introduces a method and apparatus for efficiently providing a measurement procedure of a UE serviced through the non-terrestrial network.

There is no explicit definition of one cell in the conventional NR standard. However, the PCI is used in the NR standard. Within the frequency span of a carrier, multiple SSBs can be transmitted. The PCIs of those SSBs do not have to be unique, ie different SSBs can have different PCIs. However, when an SSB is associated with an RMSI, the SSB corresponds to an individual cell, which has a unique NCGI (NR cell global identifier). Such an SSB is referred to as a Cell-Defining SSB (CD-SSB). A PCell is always associated to a CD-SSB located on the synchronization raster. In view of the UE, a serving cell is associated with at most one single SSB. In the conventional NR standard, the SSB is serviced by a physical beam through which NR-PSS, NR-SSS, and NR-PBCH are transmitted, and a plurality of SSBs in one cell share the same PCI. And the SSB was transmitted in the TDM scheme by the beam sweeping.

One satellite beam is one beam generated from one satellite platform, and one earth footprint or radio coverage is formed by one satellite beam. For example, the corresponding radio coverage may be an area capable of receiving a signal having a value as large as a certain threshold value in the largest signal of the beam. In order to efficiently provide the NTN by recycling the NR standard as much as possible, it is assumed that the UE does not consider the ability to distinguish a satellite beam, a satellite, or a satellite cell that is distinguished from the NR cell.

Figure 12:
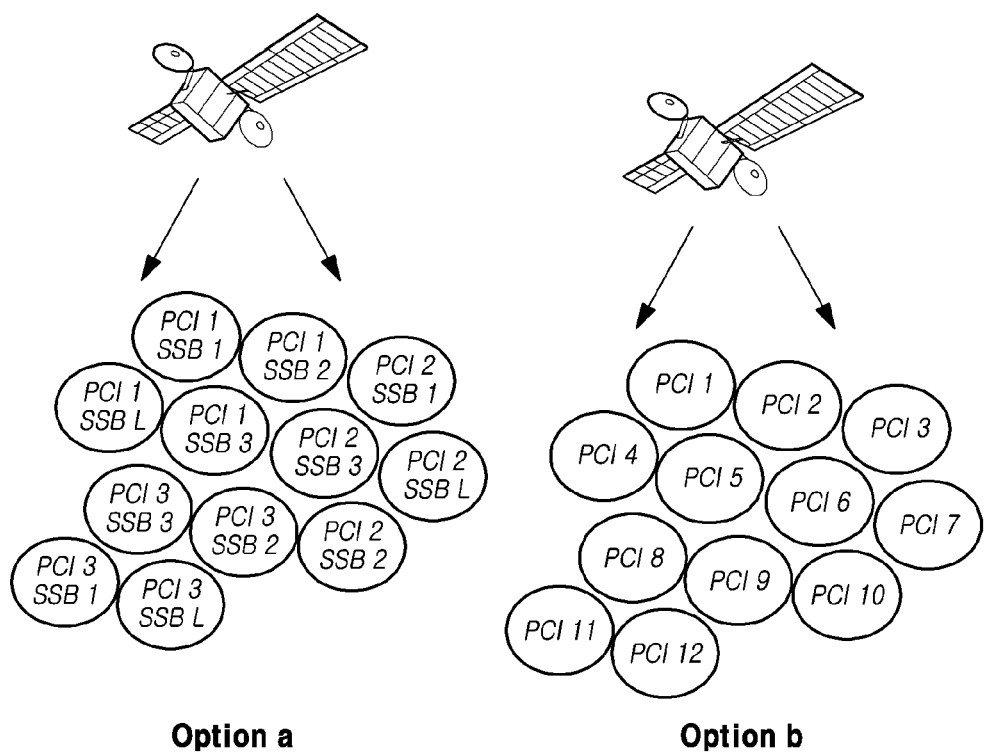
FIG. 12 illustrates a configuration of an NTN satellite beam.

FIG. 12 illustrates a configuration of an NTN satellite beam to which the embodiments may be applied.

Referring to FIG. 12, a configuration example of a satellite beam when constructing the NTN based on the NR will be described. First, as in option a, the same PCI may be configured for multiple (e.g. L) satellite beams. The association between the PCI and the SSB may be implemented in a similar way to the NR. For example, one SSB may be provided per one PCI. Alternatively, a plurality of SSBs may be provided in one PCI. A plurality of SSBs may be provided in a TDM manner by one satellite beam. Through this, although the same cell identification information is provided, beam mobility may be provided by distinguishing satellite beams. Meanwhile, since the NTN has a large delay between the UE and the satellite, the effect may be limited when using the plurality of SSBs in the TDM method. Therefore, if the plurality of SSBs are provided for the same PCI, different satellite beams may be configured to have different SSBs by providing them in the FDM method. In this case, one or more information elements may be provided through different MIB information and different SIB1 in order to distinguish respective frequencies of satellite beams providing different SSBs for the same PCI. Through this, although the same cell identification information such as the PCI is provided, beam mobility may be provided by distinguishing the satellite beams. Alternatively, in the satellite beams providing the different SSBs for the same PCI, one or more information elements may have the same MIB information, but one or more information elements may be provided through different SIB1s.

NR SIB1 may include cell selection information for serving cell selection (cellSelectionInfo), cell access related information including PLMN ID (CellAccessRelatedInfo), information for connection establishment failure control (ConnEstFailureControl), scheduling information for system information (si-SchedulingInfo), common configuration information of the serving cell (servingCellConfigCommon), integrated access barring information (uac-BarringInfo), information for IMS emergency bearer service support (ims-Emergency Support), timer and constant value information to be used by the UE (ue-TimersAndConstants), etc. The common configuration information of the double serving cell includes the PCI, downlink common configuration information (downlinkConfigCommon), uplink common configuration information (uplinkConfigCommon), etc. The downlink common configuration information includes downlink frequency information (frequencyInfoDL) and initial downlink BWP (initialDownlinkBWP) information, and uplink common configuration information includes uplink frequency information (frequencyInfoUL) and initial uplink BWP (initialuplinkBWP) information. The satellite beams providing the different SSBs for the same PCI have the same MIB information, but may provide individual SIB information elements (e.g. downlink frequency information, uplink frequency information) for satellite beams providing each SSB.

Alternatively, the satellite beams providing the different SSBs for the same PCI may be provided through the same MIB and the same SIB1 with one or more information elements. Alternatively, the satellite beams providing the different SSBs for the same PCI may provide the same SIB1 although one or more information elements have different MIB information.

It may be configured to have one PCI per the satellite beam, for example as in option b. Because NTN's coverage is large compared to that of high-frequency based terrestrial NR, it is not necessary to provide the multiple SSBs for the same PCI. Accordingly, one satellite beam may be configured as one cell. Through this, different satellite beams may be configured to have different PCI (or NGCI). The association between the PCI and the SSB can be implemented in a similar way to the NR. For example, one SSB may be provided per one PCI. Alternatively, the plurality of SSBs may be provided in one PCI. The plurality of SSBs may be provided in a TDM manner by one satellite beam. In the above description, an example of linking one PCI to one or a plurality of SSBs has been described, but this is only for convenience of description, and the present disclosure may be also applied to an arbitrary scenario in which one cell is divided into the plurality of satellite beams having the same PCI and transmitted.

In order to efficiently process measurement and reporting of a UE serviced through the non-terrestrial network in the various scenarios described above, the embodiments herein may be used individually or in any combination.

The base station in the present specification may mean a public entity such as a satellite that transmits and receives information to the UE in an NTN environment. Alternatively, it may refer to a terrestrial entity that generates data transmitted/received through an aerial entity such as a satellite. That is, the base station in the present disclosure means an entity that transmits and receives data to and from the UE in the NTN environment, and there is no limitation on the term.

Figure 13:
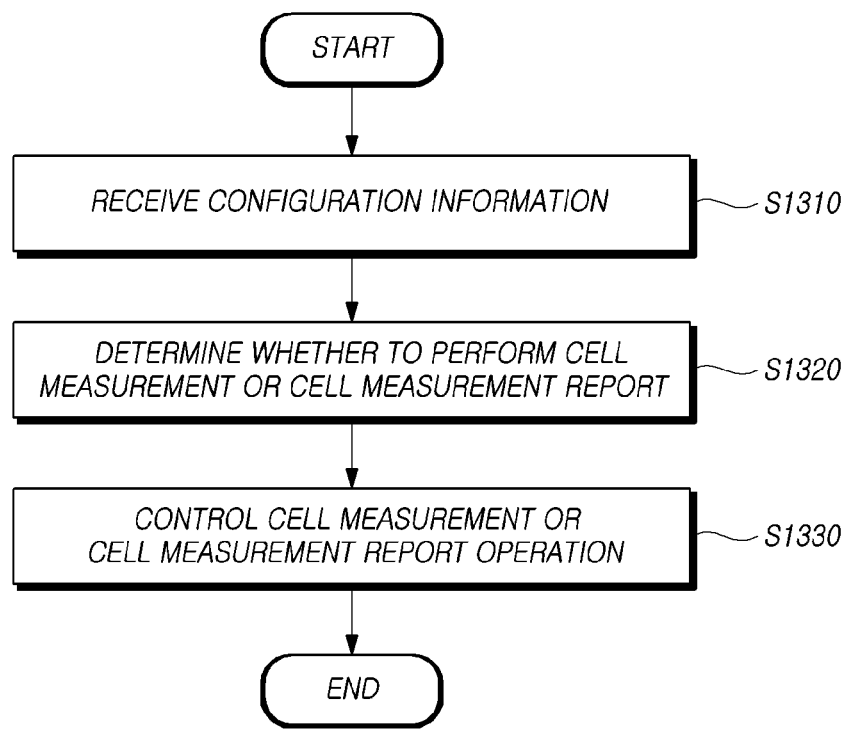
FIG. 13 is a flowchart for describing operations of a UE according to an embodiment.

FIG. 13 is a flowchart for describing operations of a UE according to an embodiment.

Referring to FIG. 13, a user equipment (UE) for performing communication using a non-terrestrial network may perform a step of receiving configuration information for controlling a cell measurement or a cell measurement report in the non-terrestrial network from the base station at S1310.

For example, the configuration information may include at least one of skip duration information for stopping the cell measurement or the cell measurement report for a certain duration of time, location range information, and UE movement correction parameter information. According to an embodiment, the configuration information may include at least one of a measurement period, a threshold value, a measurement location, a timer value, and neighbor cell information for the UE to perform a measurement operation on the cell. According to another embodiment, the configuration information may include at least one of a measurement report trigger condition, a measurement report period, a timer value, a threshold value, and a measurement report location for the UE to perform a measurement operation on the cell and report it to the base station. In addition to this, the configuration information may include parameters used for the UE to measure and report the channel state of one or more cells or beams.

Meanwhile, as described above, it is expected to perform handover frequently in the non-terrestrial network, and information for skipping the cell measurement or the cell measurement report may be further included in the configuration information. For example, the configuration information may include skip duration information for the UE to skip or stop the cell measurement or the cell measurement report for a certain period, a timer value, location range information used to skip location-based cell measurement or cell measurement report, and UE movement correction parameter information for correcting the location in consideration of the mobility of the UE.

The configuration information may be included in the RRC message or the system information to be received by the UE. The parameters included in the more specific configuration information and the operation of the UE using the parameters will be described below by dividing them into detailed embodiments.

The UE may perform a step of determining whether to perform the cell measurement or the cell measurement report using the configuration information at S1320.

According to an embodiment, the UE may determine whether the timer included in the configuration information is running. While the timer is running, the UE determine not performing the cell measurement or the cell measurement report operation. For example, the configuration information may include a specific timer or timer value. When the timer start operation is triggered, the UE starts the timer, and when the corresponding timer is in operation, the UE may not perform the cell measurement or the cell measurement report even if they is triggered. If the timer expires, the UE monitors whether the cell measurement or the cell measurement report is triggered, and when triggered, the cell measurement or the cell measurement report operation may be performed.

According to another embodiment, the target for determining whether to perform the cell measurement or the cell measurement report may be at least one of a serving cell, an intra frequency band, an inter frequency band, and an inter radio access technology neighbor cell. That is, it may be determined whether the cell measurement or the cell measurement report is performed according to the above-described timer operation for all of the serving cell, the intra frequency band, the inter frequency band, and the inter radio access technology neighbor cell. Alternatively, a different timer may be applied to each cell or measurement target. Alternatively, a specific target of each cell or measurement target is indicated by the base station and it may be determined whether the cell measurement or the cell measurement report is performed only for the indicated cell or measurement target. In this case, the configuration information may further include information on a cell or measurement target indicated by the base station. Of course, in the opposite case, a target for determining whether to report the cell measurement or the cell measurement report may be selected except for the cell or the measurement target indicated by the base station.

As described above, in determining the cell measurement or the cell measurement report, a location factor rather than a time factor may be applied. For example, when the UE is located in a specific area indicated by the configuration information, the UE may determine that the cell measurement or the cell measurement report operation is not performed. Alternatively, if the UE is not located in a specific area indicated by the configuration information, the UE may determine that the cell measurement or the cell measurement report operation is not performed.

The UE may perform a step of controlling the cell measurement or the cell measurement report operation according to the determination result at 51330.

For example, if the UE determines to skip the cell measurement or the cell measurement report, the UE may not perform the cell measurement or the cell measurement report even if the cell measurement report is triggered. That is, if the UE determines not to perform the cell measurement or the cell measurement report according to the above-described timer or location even if the normal cell measurement or the normal cell measurement report period arrives and the cell measurement or the cell measurement report is triggered, the UE does not perform the cell measurement or the cell measurement report operation in the corresponding period.

Through the above operation, the UE may prevent cell measurement or cell measurement report operation from being performed frequently. Accordingly, the UE may effectively manage processes and power.

The above-described UE operation will be described in more detail by dividing it into individual embodiments below. Individual embodiments described below may be combined in whole or in part by any combination and performed by the UE.

Figure 14:
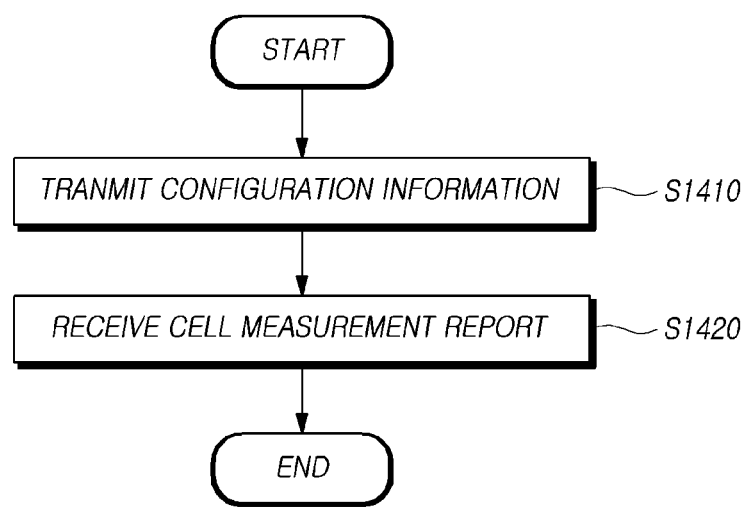
FIG. 14 is a flowchart for describing operations of a base station according to an embodiment.

FIG. 14 is a flowchart for describing operations of a base station according to an embodiment.

Referring to FIG. 14, a base station performing communication using a non-terrestrial network with a user equipment (UE) may perform a step of transmitting configuration information for controlling a cell measurement or a cell measurement report in the non-terrestrial network to the UE at S1410.

For example, the configuration information may include at least one of skip duration information for stopping the cell measurement or the cell measurement report for a certain duration of time, location range information, and UE movement correction parameter information. According to an embodiment, the configuration information may include at least one of a measurement period, a threshold value, a measurement location, a timer value, and neighbor cell information for the UE to perform a measurement operation on the cell. According to another embodiment, the configuration information may include at least one of a measurement report trigger condition, a measurement report period, a timer value, a threshold value, and a measurement report location for the UE to perform a measurement operation on the cell and report it to the base station. In addition to this, the configuration information may include parameters used for the UE to measure and report the channel state of one or more cells or beams.

In addition, the configuration information may include skip duration information for the UE to skip or stop the cell measurement or the cell measurement report for a certain period, a timer value, location range information used to skip location-based cell measurement or cell measurement report, and UE movement correction parameter information for correcting the location in consideration of the mobility of the UE.

The configuration information may be included in the RRC message or system information and transmitted to the UE.

The base station may perform the step of receiving the cell measurement report according to the result of determining whether the UE performs the cell measurement or the cell measurement report using the configuration information at S1420.

According to an embodiment, the UE may determine whether the timer included in the configuration information is running. While the timer is running, the UE may determine not to perform the cell measurement or the cell measurement report operation. For example, the configuration information may include a specific timer or timer value. When the timer start operation is triggered, the UE starts the timer, and when the corresponding timer is in operation, the UE may not perform the cell measurement or the cell measurement report even if they is triggered. If the timer expires, the UE monitors whether the cell measurement or the cell measurement report is triggered, and when triggered, the cell measurement or the cell measurement report operation may be performed.

According to another embodiment, the target for determining whether to perform the cell measurement or the cell measurement report may be at least one of a serving cell, an intra frequency band, an inter frequency band, and an inter radio access technology neighbor cell. That is, it may be determined whether the cell measurement or the cell measurement report is performed according to the above-described timer operation for all of the serving cell, the intra frequency band, the inter frequency band, and the inter radio access technology neighbor cell. Alternatively, a different timer may be applied to each cell or measurement target. Alternatively, a specific target of each cell or measurement target is indicated by the base station and it may be determined whether the cell measurement or the cell measurement report is performed only for the indicated cell or measurement target. In this case, the configuration information may further include information on a cell or measurement target indicated by the base station. Of course, in the opposite case, a target for determining whether to report the cell measurement or the cell measurement report may be selected except for the cell or the measurement target indicated by the base station.

As described above, in determining the cell measurement or the cell measurement report, a location factor rather than a time factor may be applied. For example, when the UE is located in a specific area indicated by the configuration information, the UE may determine not to perform the cell measurement or cell measurement report operation. Alternatively, if the UE is not located in a specific area indicated by the configuration information, that the UE may determine not to perform the cell measurement or cell measurement report operation.

The base station receives the cell measurement report from the UE when the cell measurement and cell measurement report of the UE is triggered, and the cell measurement report execution condition of the UE is satisfied. For example, if it is determined that the cell measurement or the cell measurement report is not performed because the UE is skipped, the UE may not perform the cell measurement or the cell measurement report even if the cell measurement report is triggered. That is, if it is determined that the cell measurement or cell measurement report is not performed according to the above-described timer or location even if the normal cell measurement or the normal cell measurement report period arrives and the cell measurement or the cell measurement report is triggered, the cell measurement or the cell measurement report operation is not performed in the corresponding period.

Through the above operation, the UE may prevent cell measurement or cell measurement report operation from being frequently performed. Accordingly, the UE may efficiently manage processes, power, and the like.

Hereinafter, various operations that may be performed by the above-described UE and the above-described base station will be separately described in each embodiment. Each embodiment may be applied individually or in any combination.

1) Embodiment: Indicating to Skip Cell Measurement within a Section in which the Serving Satellite/Satellite Beam is not Changed Using Satellite Orbit Information The UE may be located within the coverage of one satellite. Alternatively, the UE may be located within overlapped coverages of a plurality of satellites. If the UE is within coverage of one satellite/satellite beam, the UE may not be necessary for considering changing the satellite/satellite beam/cell in the time range in which the corresponding satellite/satellite beam/cell is not changed in the current location, area or zone. Although the radio quality of the corresponding satellite/satellite beam/cell may be temporarily deteriorated, the location of the UE may not change significantly. In this case, if the satellite/satellite beam/cell covering the location is unique, it may skip the cell measurement because there may be no need to perform satellite/satellite beam/cell change.

Specifically, when the UE is located within coverage overlapped by a plurality of satellites may be divided into two cases. First, the UE is located at the boundary/edge of a plurality of satellites/satellite beams/cells. When the UE is located at the boundary/edge of the serving satellite/satellite beam/cell, the UE is expected to change the satellite/satellite beam/cell. Therefore, a normal cell measurement and a normal measurement report operation may be required. On the other hand, even if the UE is located within the coverage overlapped by a plurality of satellites, if the UE is located in the center portion of the serving satellite/satellite beam/cell, it may skip the cell measurement because there may be no need to perform satellite/satellite beam/cell change.

Hereinafter, For convenience of description, since there may be no need to perform satellite/satellite beam/cell change, performing an operation for reducing the cell measurement or the cell measurement reporting overhead is referred to as cell measurement skip. This is for convenience of description and may be replaced with any other terminology. For example, the cell measurement skip may indicate that the UE is not required to perform measurements on intra-frequency, inter-frequency, and inter-RAT neighboring cells. For another example, the cell measurement skip may indicate that the UE is not required to perform measurement on the serving cell. For another example, the cell measurement skip may indicate that the UE is not required to perform measurement on a neighboring cell for one or more cases of intra-frequency, inter-frequency, and inter-RAT neighboring cells. As another example, cell measurement skip may indicate that the UE is not required to perform measurement on the serving cell and the neighboring cell. As another example, cell measurement skip may indicate that it is not required for the UE to perform cell measurement report for intra-frequency, inter-frequency, and inter-RAT. For another example, the cell measurement skip may indicate that it is not required to perform the cell measurement report for the serving cell. For another example, the cell measurement skip may indicate that the UE is not required to perform cell measurement report on the serving cell and the neighboring cell.

The Cell measurement skip may be applied to the RRC connected state UE. Alternatively, the cell measurement skip may be applied to RRC idle or RRC inactive state UEs.

Meanwhile, the base station may transmit configuration information for indicating the above-described cell measurement skip through the measurement configuration information such as measconfig message or the system information of the UE. The corresponding configuration information may include information for configuring to perform measurement based on SSB RSRP or CSI-RS RSRP. Hereinafter, this will be described in more detail.

On the other hand, satellite orbit information such as ephemeris is publicly available. It includes x, y, z coordinate information and velocity information in an earth-centered, earth-fixed coordinate system according to time. The time may be an epoch including year, month, day, hour, and second information. FIG. 15 illustrates satellite orbit information according to an embodiment. FIG. 16 illustrates a parameter value of satellite orbit information according to an embodiment.

Referring to FIG. 15 and FIG. 16, satellite orbit information is information about orbital trajectories of the satellite, including a semi-major axis, an eccentricity, an inclination, and an ophthalmic axis such as right ascension of the ascending node, perigee such as argument of periapsis, mean anomaly at a reference point in time, and satellite orbit information reference time such as the epoch.

If the network (or UE) may utilize the satellite orbit information, it may help to reduce the overhead of measurement and measurement report for satellite/satellite beam/cell change. To this end, it is necessary to configure the satellite orbit information for each satellite beam/cell. Each satellite beam may be associated with an identifier for identifying the corresponding satellite beam. For example, the satellite beam may be associated with an SSB index. Alternatively, the satellite beam may be associated with a CSI-RS index.

The base station may provide information on the satellite beam according to time that covers the current location of a specific UE (or the geographic area/region/zone in which the UE is currently located). To this end, the satellite orbit information for each satellite as shown in FIG. 15 or FIG. 16 may be used separately for each satellite beam/cell. The satellite beam/cell may be associated with the SSB index for each base station. Alternatively, the satellite beam/cell may be linked to the CSI-RS index for each base station. The gNB ID may be used for base station identification. For example, a specific satellite beam/cell may be identified through a combination of the base station identifier and the SSB-index.

The orbit information for each satellite beam/cell transmitted by the base station may be pre-configured and stored. Alternatively, the corresponding information is pre-configured and stored through another network entity/node/application server or OAM, and the base station may inquire and receive it. For example, one base station may receive the orbit information for each satellite beam/cell transmitted by the base station from another/neighboring base station. As another example, the UE may receive the orbit information for each satellite beam/cell transmitted by the base station through an arbitrary core network entity (e.g. AMF).

The satellite beam/cell information according to time (timely) for each location/geographical area/region/zone serviced by an arbitrary satellite beam transmitted by the corresponding base station may be pre-configured and stored. Alternatively, the corresponding information is pre-configured and stored through another network entity/node/ application server or OAM, and the UE or the base station may inquire and receive it.

The orbit information for all satellites/satellite beams/ cells that will service the UE may be stored/provisioned/ configured in advance in the UE (e.g. USIM). The orbit information for each satellite may be distinguished by being assigned an ID/index for identifying it. The base station may broadcast the corresponding satellite ID/identifier information through the system information. Through this, the UE may extract detailed orbit information of the corresponding satellite from the orbit information stored in the UE (e.g. USIM), and thus may derive the location information (e.g. coordinate information) of the serving satellite. Alternatively, the UE may derive the location information of the base station from any orbit information indicated by the base station through the system information. The trajectory information indicated by the base station through the system information may be any information in FIG. 15 or FIG. 16 or information processed in an arbitrary form.

The base station may request and receive the current location information of the UE from the UE, and estimate the location of the UE based on the information received from the UE. The base station may request and receive assistance information for estimating the location of the UE from the UE. For example, information useful for estimating the location of the UE, such as the speed, the moving direction, the moving route, the destination, and the arrival time of the destination, may be obtained from the UE. An aircraft UE such as an airplane may have movement route information for each time zone according to a flight schedule. The base station may designate the format of information required to estimate the location information of the UE and request it from the UE. For example, information on the arrival time to the distance to the edge/boundary/center included in the coverage of the neighboring satellite/satellite beam may be requested. For another example, it is possible to request information about the moving direction and the speed of the UE.

If the UE has the capability to calculate/determine the location (e.g. using GNSS), the UE may report the location information of the UE to the base station by the request/ indication of the base station. If the UE cannot calculate/ determine its location, the region in which the UE is located may be distinguished by the UE's current beam ID, cell ID, TAC unit, and the like. The network may know the current satellite beam, cell, and TA of the connected UE. The base station may determine the next candidate satellite beam/cell for a specific UE by using the received information and satellite orbit information. Alternatively, the base station may know the next candidate satellite beam/cell information at the current location of a specific UE in consideration of the satellite beam change period/interval in an arbitrary location/geographical area/region/zone. For example, if the satellite beam change period/interval is 5 minutes and the current location is estimated to have passed 2 minutes after the beam change, it may be estimated that it will be serviced by satellite beam #2 after 3 minutes, by satellite beam #3 after 8 minutes, and satellite beam #4 after 13 minutes.

Figure 17:
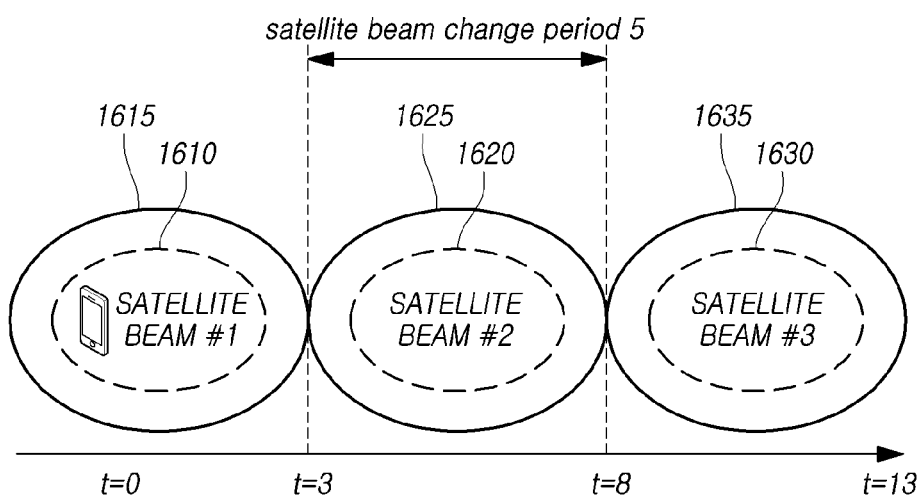
FIG. 17 illustrates an estimated time for changing a satellite beam/cell according to satellite orbit information according to the present embodiment.

FIG. 17 exemplarily illustrates an estimated time for changing a satellite beam/cell according to satellite orbit information according to an embodiment.

Referring to FIG. 17, small circles 1610, 1620, and 1630 indicated by a dotted line in each satellite/satellite beam/cell indicate the center portion of the corresponding satellite beam/cell coverage 1615, 1625, 1635 indicated by a solid line. When the UE is in the center portions 1610, 1620, and 1630, the UE may not perform the satellite/satellite beam/ cell change within a short time. Therefore, it may skip the cell measurement. On the other hand, if the UE is out of the center of each satellite beam/cell coverage, for example, out of the small circles 1610, 1620, and 1630 indicated by dotted lines, the UE may be configured to perform measurement.

This embodiment may be applied to a satellite beam moving scenario such as the earth moving beam footprint. In addition, this embodiment may be applied to all satellite beam fixed scenarios such as the earth fixed beam. Since the satellite/satellite beam is changed over time in a specific location/location area/zone in both scenarios, the present invention may be applied regardless of the scenario. For example, in FIG. 17, when the UE establishes/sets up the RRC connection through the satellite beam #1 and transitions to the connected state at t=0, the UE may no need to perform the measurement because it does not expect to change the satellite/satellite beam/cell until t=2. A satellite/ satellite beam/cell change is expected for a time from t=2 to t=4, so the UE may need to perform a measurement operation. That is, the UE may be configured to perform the cell measurement or the cell measurement report for satellite beam/cell change only in a specific time region or at a specific location through the duration information for satellite beam/cell change.

2) Embodiment: Parameter Configuration for Cell Measurement Skip and UE Operation The base station may transmit configuration information for indicating (e.g., inform) the UE to perform a cell measurement skip operation to the UE when the UE is located near the center of the serving satellite beam/cell coverage/footprint. For example, the base station may transmit, to the UE, configuration information defining that the UE is not required to perform cell measurement in the vicinity of the center of the satellite beam/cell coverage/ footprint. As another example, the base station may transmit, to the UE, configuration information defining that the UE is not required to perform the cell measurement for a time when a satellite beam/cell change is not expected.

As an example, the base station may configure a skip duration, an effective time or a time range for skipping the cell measurement which is not required to perform measurement in the UE. Upon receiving the RRC message including the corresponding parameter, the UE starts a timer set to the corresponding parameter value. For example, the UE starts a timer that sets the corresponding parameter value as an expiration value.

If the above-described configuration information is not configured in the UE, the UE performs the cell measurement operation. For example, the UE performs a corresponding measurement operation in the associated neighboring cell on the frequency indicated in the measurement target. Alternatively, the UE derives a cell measurement result based on the SSB by using the parameter indicated by the base station for each trigger quantity and each measurement quantity from the measurement target. Alternatively, the UE derives the cell measurement result based on the CSI-RS by using a parameter indicated by the base station for each trigger quantity and each measurement quantity from the measurement target. Alternatively, the UE performs the measurement operation of a serving cell and/or a neighboring cell.

If the configuration information is configured in the UE and if the timer set to the corresponding parameter value has not expired, the UE skips the cell measurement operation.

If the configuration information is configured in the UE and if the timer set to the corresponding parameter value expires, the UE performs the cell measurement operation. For example, the UE performs the corresponding measurement operation in the associated neighboring cell on the frequency indicated in the measurement target. Alternatively, the UE derives the cell measurement result based on the SSB by using the parameter indicated by the base station for each trigger quantity and each measurement quantity from the measurement target. Alternatively, the UE derives the cell measurement result based on the CSI-RS by using a parameter indicated by the base station for each trigger quantity and each measurement quantity from the measurement target. Alternatively, the UE performs the measurement operation of the serving cell and/or the neighboring cell.

As an example, the base station may configure (e.g., set or define) the location/area/zone to skip the cell measurement (not required to perform measurement) in the UE. Alternatively the base station may configure a range of the location/area/zone and duration/effective time/time to skip the cell measurement or not to perform the cell measurement in the UE.

When the UE receives the RRC message including the corresponding parameter, it sets the location information to the received value in order to operate it and/or starts a timer set to the received duration/valid time/time range parameter value. Here, the location information may mean a geocentric fixed coordinate system x, y, z or a range thereof, latitude, longitude, sea level, or a range thereof on the earth. Alternatively, the location information may mean arbitrary location information such as a zone identifier when an arbitrary geographic area is divided into zones. Alternatively, the location information may mean a corresponding reference location area identifier when an arbitrary geographic area is divided into reference location areas.

If the configuration information is not configured in the UE, the UE performs the cell measurement operation. For example, the UE performs a corresponding measurement operation in the associated neighboring cell on the frequency indicated in the measurement target. Alternatively, the UE derives the cell measurement result based on the SSB by using the parameter indicated by the base station for each trigger quantity and each measurement quantity from the measurement target. Alternatively, the UE derives the cell measurement result based on the CSI-RS by using a parameter indicated by the base station for each trigger quantity and each measurement quantity from the measurement target. Alternatively, the UE performs the measurement operation of the serving cell and/or the neighboring cell.

If the configuration information is configured in the UE, the UE does not deviate from the range of the location/area/zone, and the timer set to the corresponding parameter value has not expired, the UE skips the cell measurement operation.

If the configuration information is configured in the UE, the UE is out of the range of the location/area/zone, or the timer set to the corresponding parameter value expires, the UE performs the cell measurement operation. For example, the UE performs the corresponding measurement operation in the associated neighboring cell on the frequency indicated in the measurement target. Alternatively, the UE derives the cell measurement result based on the SSB by using the parameter indicated by the base station for each trigger quantity and each measurement quantity from the measurement target. Alternatively, the UE derives the cell measurement result based on the CSI-RS by using a parameter indicated by the base station for each trigger quantity and each measurement quantity from the measurement target. Alternatively, the UE performs the measurement operation of the serving cell and/or the neighboring cell.

The duration/effective time/time range used for the above-described timer may be indicated using a value based on international standard time such as coordinated universal time. The UE may apply the indicated value based on the international standard time as a condition. For example, the base station may indicate the coordinated universal time corresponding to the SFN boundary after the PDSCH end boundary through which the corresponding RRC message is transmitted, and the base station may indicate the offset time from this until the cell measurement skip is terminated. As another example, the base station may indicate the start coordinated universal time of the next cell measurement. The UE may already know the coordinated universal time through system information (e.g. SIB9). Therefore, the UE may utilize it. As another example, the base station may indicate the elapsed time or offset time until the start of the next cell measurement.

The above-described location/area/zone/reference switch area may be pre-stored/provisioned/configured in the base station or the UE in the same manner as the above-described satellite orbit information. Alternatively, the location/area/zone/reference switch area may be configured in the UE by the base station. Information on the location/area/zone/reference switch area configured by the base station may be used to calculate which location/area/zone/reference switch area the UE is included in based on the location information of the UE. A formula for this may be pre-configured in the UE or may be indicated from the network. Accordingly, if the UE has the capability to calculate/determine a location (e.g. using GNSS), the UE may calculate which location/location area/zone/reference switch area is included in the corresponding location.

For another example, the base station may indicate, to the UE, a condition for the UE to release the cell measurement skip or to enter a section requiring the cell measurement or the cell measurement report.

For example, the base station may configure a measurement (e.g. RSRP) threshold for the corresponding satellite beam in the UE. The threshold information may be indicated in association with measurement ID included in a measurement configuration information. For example, condition information for a measurement threshold may be configured through a combination of one or more of an event A2 indicating that the quality of the source cell is worse than the absolute threshold (Serving becomes worse than absolute threshold), or an event A4 indicating that the quality of the target cell is better than the absolute threshold (Neighbor becomes better than the absolute threshold) and an event A3 for general handover (Neighbor becomes amount of offset better than PCell/PSCell). Accordingly, the threshold information may be included in the reporting configuration (ReportConfigNR) information element.

As another example, the base station may configure the location TA (Timing Advance) threshold for the corresponding satellite beam in the UE. The TA is used to adjust the uplink frame timing relative to the downlink frame. The TA is the value doubled by the propagation delay. When the UE is in the center of the satellite beam, the TA has the smallest value, and when the UE is in the edge of the satellite beam, the TA has the largest value.

The UE may acquire the TA using the following method. First, the UE may receive an initial TA value by the base station during the random access procedure. Alternatively, for the RRC connected state UE, the base station may transmit the TA through the MAC CE. The UE may refine the TA by using the location of the UE and the orbit information of the satellite based on the TA received by the base station. For example, when the UE knows the location of the UE, the distance between the UE and the satellite may be calculated from the location of the UE and the location of the satellite. Dividing the distance value by the speed of light gives the propagation delay. The UE may know whether the UE has entered a section requiring the cell measurement based on the TA value calculated based on the satellite orbit information and the location information of the UE and the TA threshold value indicated by the base station.

The above conditions may be used independently or in any combination of conditions. For example, when the aforementioned timer expires (or in an expired state), the cell measurement or the cell measurement report may be started when the aforementioned measurement threshold is satisfied.

The base station may include cell change or beam change period information included in FIG. 17 as information for controlling/triggering the cell measurement or the cell measurement reporting.

3) Embodiment of Performing Correction in Consideration of UE Movement, Etc.

When the satellite/satellite beam/cell moves in a scenario where the satellite/satellite beam/cell moves, the location of the UE may be changed. Even in the case of a scenario in which the footprint of the satellite beam is fixed on the earth, the location of the UE may be changed. In this case, it is necessary to adjust the time to skip cell measurement.

For example, the base station may indicate, to the UE, a static offset parameter for correcting the mobility of the UE in addition to the duration/effective time/time range for skipping the cell measurement (not required to perform measurement). When the corresponding offset parameter is configured, the UE may operate the set timer using a value obtained by adding or subtracting the corresponding value to the duration/effective time/time range for skipping the cell measurement.

For another example, the base station may indicate, to the UE, a scaling parameter for correcting the mobility of the UE in addition to the duration/effective time/time range in which the cell measurement is not required to be skipped (measurement is not required). When the corresponding scaling parameter is configured, the UE may operate the timer using a value obtained by multiplying the corresponding value by the duration/effective time/time range for skipping the cell measurement.

For another example, the base station may indicate the UE to include satellite beam information in the mobility history report in order to calculate the above-described offset parameter or the scaling parameter. The mobility history report may include information on one or more of a base station identifier, an SSB index or a CSI-RS index, and a timestamp. The UE may report mobility information (e.g., mobility history report) in units of satellite beams to the base station. In the case of RRC connection establishment of an RRC idle UE or RRC connection resumption of an RRC inactive UE, the mobility information transmission in units of satellite beams may be performed at the request of the base station. Alternatively, the mobility information transmission in units of satellite beams may be performed at the request of the base station in the case of an RRC connected UE. Alternatively, when information indicating that the mobility history information is available is included in the RRC connection establishment or the RRC connection resumption process, the UE may transmit the mobility history information at the request of the base station.

As another example, when the UE performs handover according to a satellite beam/cell change, a measurement operation may be performed according to configuration information indicated by the target base station associated with the target satellite beam/cell. In general, the RRC connection reconfiguration message is configured by indicating only the changed part. Accordingly, when the handover is performed in a state in which the UE has configured the configuration information including the parameter for skipping the above-described cell measurement by the source base station, the corresponding parameter is continuously maintained. Accordingly, even after the handover is completed, the corresponding parameter is applied so that the UE may skip the cell measurement.

For preventing this, when the handover is performed or when a reconfiguration with sync message is received, the UE may release the corresponding parameter. As another example, when the handover is performed or when the reconfiguration with sync message is received, the UE may stop a timer set with a corresponding parameter. As another example, when the handover is performed or when the reconfiguration with sync message is received, the UE may release the timer set with the corresponding parameter. As another example, when the handover is performed or when the reconfiguration with sync message is received, the UE may start another timer for starting the timer set with the corresponding parameter. And another timer may be indicated by the base station.

As another example, even if the UE is near the center of the satellite beam/cell coverage/footprint, in a special case, it may allow the cell measurement. For example, even if the UE is near the center of the satellite beam/cell coverage/footprint, it may be allowed to perform the cell measurement when a failure occurring in the upper L1 such as RACH failure or RLC failure is detected. To this end, the UE may perform or resume the cell measurement and the cell measurement report in a specific case (e.g., when a failure occurs in the upper L1 such as RACH failure, RLC failure, etc.) even if the parameters for the cell measurement skip are configured.

For another example, even if the UE is near the center of the satellite beam/cell coverage/footprint, in a special case (e.g., when the measurement value is lower than the threshold value), it is necessary to perform measurement. When the UE operation is described in consideration of the special case, when the UE receives an RRC message including the corresponding parameter, in order to operate it, a timer set to the corresponding parameter value is started.

If the configuration information for the cell measurement skip is not configured in the UE, the UE performs the cell measurement operation.

If the configuration information for the cell measurement skip is configured in the UE, the timer set to the corresponding parameter value has not expired, and the RSRP of the NR special cell is lower than the threshold value according to the S-measure configuration information, the UE skips the measurement. That is, the S-measure configuration may be considered in preference to the above-described parameters. Conversely, it may be implemented such that the above-described parameters are considered in preference to the S-measure configuration.

If the configuration information for the cell measurement skip is configured in the UE and the timer set to the corresponding parameter value has not expired, the UE skips the cell measurement operation.

If the configuration information for the cell measurement skip is configured in the UE and the timer set to the corresponding parameter value expires, the UE performs the cell measurement operation.

For another example, even when the UE is indicated to skip the cell measurement because the satellite beam/cell is near the center of the coverage/footprint, the UE may need to perform the cell measurement report operation. For example, the UE may not perform the corresponding cell measurement according to the configuration information indicating the UE to skip the cell measurement because the satellite beam/cell is near the center of the corresponding coverage/footprint. However, even while not performing the cell measurement, if a specific trigger type is configured in the cell measurement report configuration in the UE (e.g., when the trigger type is configured as an event or periodically), the UE may transmit a periodic cell measurement report.

As described above, the present embodiments may efficiently perform the cell measurement and the measurement report of the UE serviced through the non-terrestrial network.

Hereinafter, hardware and software structural configuration of a UE and a base station capable of performing some or all of the operations of each of the above described embodiments will be described again with reference to FIG. 1 to FIG. 17.

Figure 18:
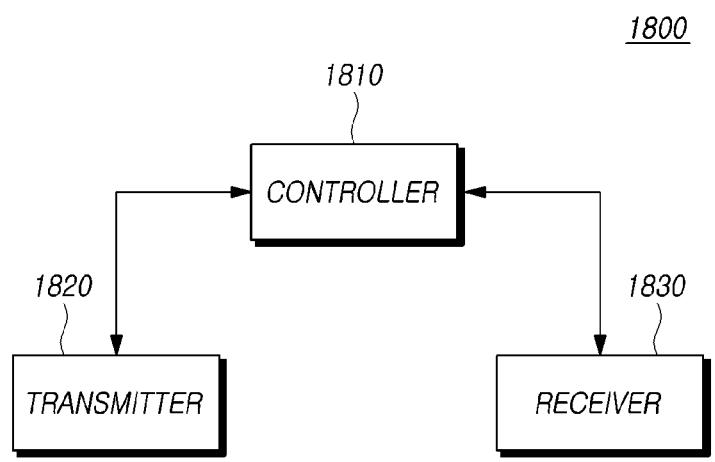
FIG. 18 is a block diagram illustrating a UE according to an embodiment.

FIG. 18 is a block diagram illustrating a UE according to an embodiment.

Referring to FIG. 18, a UE 1800 according to an embodiment performing communication using a non-terrestrial network may include a receiver 1830 for receiving configuration information from a base station and a controller 1810 for determining whether to perform cell measurement or cell measurement report using the configuration information, and controlling the cell measurement or cell measurement report operation according to the determination result.

For example, the configuration information may include at least one of skip duration information for stopping the cell measurement or the cell measurement report for a certain duration of time, location range information, and UE movement correction parameter information. According to an embodiment, the configuration information may include at least one of a measurement period, a threshold value, a measurement location, a timer value, and neighbor cell information for the UE to perform a measurement operation on the cell. According to another embodiment, the configuration information may include at least one of a measurement report trigger condition, a measurement report period, a timer value, a threshold value, and a measurement report location for the UE to perform a measurement operation on the cell and report it to the base station. In addition to this, the configuration information may include parameters used for the UE 1800 to measure and report the channel state of one or more cells or beams.

Meanwhile, as described above, in the non-terrestrial network, handover may be performed frequently. Information for skipping the cell measurement or the cell measurement report may be further included in the configuration information. For example, the configuration information may include skip duration information for the UE 1800 to skip or stop the cell measurement or the cell measurement report for a certain period, a timer value, location range information used to skip location-based cell measurement or cell measurement report, and UE movement correction parameter information for correcting the location in consideration of the mobility of the UE 1800.

The configuration information may be received by being included in the RRC message or the system information.

Also, the controller 1810 may determine whether the timer included in the configuration information is running. While the timer is running, the controller 1810 may determine not to perform the cell measurement or the cell measurement report operation. For example, the configuration information may include a specific timer or timer value. When the timer start operation is triggered, the UE starts the timer, and when the corresponding timer is in operation, controller 1810 may not perform the cell measurement or the cell measurement report even if they is triggered. If the timer expires, the UE monitors whether the cell measurement or the cell measurement report is triggered, and when triggered, the cell measurement or the cell measurement report operation may be performed.

According to another embodiment, the target for determining whether to perform the cell measurement or the cell measurement report may be at least one of a serving cell, an intra frequency band, an inter frequency band, and an inter radio access technology neighbor cell. That is, it may be determined whether the cell measurement or the cell measurement report is performed according to the above-described timer operation for all of the serving cell, the intra frequency band, the inter frequency band, and the inter radio access technology neighbor cell. Alternatively, a different timer may be applied to each cell or measurement target. Alternatively, a specific target of each cell or measurement target is indicated by the base station and it may be determined whether the cell measurement or the cell measurement report is performed only for the indicated cell or measurement target. In this case, the configuration information may further include information on a cell or measurement target indicated by the base station. Of course, in the opposite case, a target for determining whether to report the cell measurement or the cell measurement report may be selected except for the cell or the measurement target indicated by the base station.

As described above, in determining the cell measurement or the cell measurement report, a location factor rather than a time factor may be applied. For example, when the UE 1800 is located in a specific area indicated by the configuration information, the controller 1810 may determine not to perform the cell measurement or the cell measurement report operation. Alternatively, if the UE 1800 is not located in a specific area indicated by the configuration information, the controller 1810 may determine not to perform the cell measurement or the cell measurement report operation.

Also, if determining skipping the cell measurement or the cell measurement report (not performing), the controller 1810 may not perform the cell measurement or the cell measurement report even if the cell measurement report is triggered. That is, if it may determine not to perform (e.g., skipping) that the cell measurement or the cell measurement report according to the above-described timer or location even if the normal cell measurement or the normal cell measurement report period arrives and the cell measurement or the cell measurement report is triggered, the controller 1810 does not perform the cell measurement or the cell measurement report operation in the corresponding period.

In addition to this, the controller 1810 controls the overall operation of the UE 1800 for controlling the cell measurement or the cell measurement report operation in the non-terrestrial network required to perform the above-described embodiment.

The transmitter 1820 and the receiver 1830 are used to transmit or receive signals, messages, or data necessary for performing the above described embodiments, with the base station.

Figure 19:
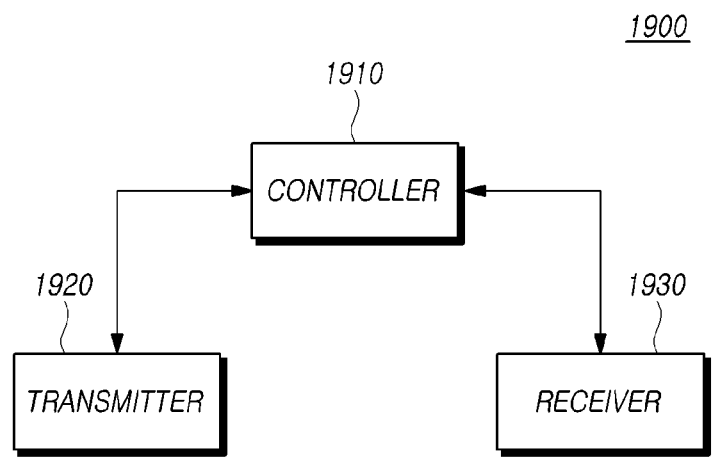
FIG. 19 is a block diagram illustrating a base station according to an embodiment.

FIG. 19 is a block diagram illustrating a base station according to an embodiment.

Referring to FIG. 19, a base station 1900 according to an embodiment performing communication using a non-terrestrial network with a user equipment (UE) may include a transmitter 1920 configured to transmit configuration information for controlling a cell measurement or a cell measurement report in the non-terrestrial network to a base station, and a receiver 1930 configured to receive the cell measurement report operation according to the determination result in which the UE determines whether to perform the cell measurement or the cell measurement report by using the configuration information.

For example, the configuration information may include at least one of skip duration information for stopping the cell measurement or the cell measurement report for a certain duration of time, location range information, and UE movement correction parameter information. According to an embodiment, the configuration information may include at least one of a measurement period, a threshold value, a measurement location, a timer value, and neighbor cell information for the UE to perform a measurement operation on the cell. According to another embodiment, the configuration information may include at least one of a measurement report trigger condition, a measurement report period, a timer value, a threshold value, and a measurement report location for the UE to perform a measurement operation on the cell and report it to the base station. In addition to this, the configuration information may include parameters used for the UE to measure and report the channel state of one or more cells or beams.

In addition, the configuration information may include skip duration information for the UE to skip or stop the cell measurement or the cell measurement report for a certain period, a timer value, location range information used to skip location-based cell measurement or cell measurement report, and UE movement correction parameter information for correcting the location in consideration of the mobility of the UE.

The transmitter 1920 may transmit the configuration information through the RRC message or the system information.

According to an embodiment, the UE may determine whether the timer included in the configuration information is running. While the time is running, the UE may determine not to perform the cell measurement or the cell measurement report operation. For example, the configuration information may include a specific timer or timer value. When the timer start operation is triggered, the UE starts the timer, and when the corresponding timer is in operation, the UE may not perform the cell measurement or the cell measurement report even if they is triggered. If the timer expires, the UE monitors whether the cell measurement or the cell measurement report is triggered, and when triggered, the cell measurement or the cell measurement report operation may be performed.

According to another embodiment, the target for determining whether to perform the cell measurement or the cell measurement report may be at least one of a serving cell, an intra frequency band, an inter frequency band, and an inter radio access technology neighbor cell. That is, it may be determined whether the cell measurement or the cell measurement report is performed according to the above-described timer operation for all of the serving cell, the intra frequency band, the inter frequency band, and the inter radio access technology neighbor cell. Alternatively, a different timer may be applied to each cell or measurement target.

Alternatively, a specific target among each cell or measurement target is indicated by the base station 1900 and it may be determined whether the cell measurement or the cell measurement report is performed only for the indicated cell or measurement target. In this case, the configuration information may further include information on a cell or measurement target indicated by the base station 1900. Of course, in the opposite case, a target for determining whether to report the cell measurement or the cell measurement report may be selected except for a cell or a measurement target indicated by the base station 1900.

As described above, in determining the cell measurement or the cell measurement report, a location factor rather than a time factor may be applied. For example, when the UE is located in a specific area indicated by the configuration information, the UE may determine not to perform the cell measurement or cell measurement report operation. Alternatively, if the UE is not located in a specific area indicated by the configuration information, the UE may determine not to perform the cell measurement or cell measurement report operation.

The receiver 1930 receives the cell measurement report from the UE when the cell measurement and cell measurement report of the UE is triggered, and the cell measurement report execution condition of the UE is satisfied. For example, if it is determined not to perform the cell measurement or the cell measurement report because the UE is skipped, the UE may not perform the cell measurement or the cell measurement report even if the cell measurement report is triggered. That is, if it is determined not to perform the cell measurement or cell measurement report according to the above-described timer or location even if the normal cell measurement or the normal cell measurement report period arrives and the cell measurement or the cell measurement report is triggered, the cell measurement or the cell measurement report operation is not performed in the corresponding period.

In addition to this, the controller 1910 controls the overall operation of the base station 1900 for controlling the cell measurement or the cell measurement report operation in the non-terrestrial network required to perform the above-described embodiment.

The transmitter 1920 and the receiver 1930 are used to transmit or receive signals, messages, or data necessary for performing the above described embodiments, with the UE.

The embodiments described above may be supported by the standard documents disclosed in at least one of the radio access systems such as IEEE 802, 3GPP, and 3GPP2. That is, the steps, configurations, and parts, which have not been described in the present embodiments, may be supported by the above-mentioned standard documents for clarifying the technical concept of the disclosure. In addition, all terms disclosed herein may be described by the standard documents set forth above.

The above described embodiments may be implemented by any of various means. For example, the present embodiments may be implemented as hardware, firmware, software, or a combination thereof.

In the case of implementation by hardware, the method according to the present embodiments may be implemented as at least one of an application specific integrated circuit (ASIC), a digital signal processor (DSP), a digital signal processing device (DSPD), a programmable logic device (PLD), a field programmable gate array (FPGA), a processor, a controller, a microcontroller, or a microprocessor.

In the case of implementation by firmware or software, the method according to the present embodiments may be implemented in the form of an apparatus, a procedure, or a function for performing the functions or operations described above. Software code may be stored in a memory unit, and may be driven by the processor. The memory unit may be provided inside or outside the processor, and may exchange data with the processor by any of various well-known means.

In addition, the terms "system", "processor", "controller", "component", "module", "interface", "model", "unit", and the like may generally mean computer-related entity hardware, a combination of hardware and software, software, or running software. For example, the above described components may be, but are not limited to, a process driven by a processor, a processor, a controller, a control processor, an entity, an execution thread, a program and/or a computer. For example, both the application that is running in a controller or a processor and the controller or the processor may be components. One or more components may be provided in a process and/or an execution thread, and the components may be provided in a single device (e.g., a system, a computing device, etc.), or may be distributed over two or more devices.

The above embodiments of the disclosure have been described only for illustrative purposes, and those skilled in the art will appreciate that various modifications and changes may be made thereto without departing from the scope and spirit of the disclosure. Further, the embodiments of the disclosure are not intended to limit, but are intended to illustrate the technical idea of the disclosure, and therefore the scope of the technical idea of the disclosure is not limited by these embodiments. The scope of the disclosure shall be construed on the basis of the accompanying claims in such a manner that all of the technical ideas included within the scope equivalent to the claims belong to the disclosure.

The invention claimed is:

1. A method for performing communication using a non-terrestrial network by a user equipment (UE), the method comprising:
   receiving configuration information for controlling a cell measurement in the non-terrestrial network from a base station;
   determining whether to perform the cell measurement by using the configuration information; and
   controlling the cell measurement operation according to the determination result;
   wherein the configuration information comprises skip duration information for stopping the cell measurement for a period of time, and
   wherein the skip duration information includes effective time or time range information for skipping the cell measurement in coverage of a non-terrestrial network cell, wherein the effective time or time range information is indicated as a value based on Coordinated Universal Time (UTC).

2. The method of claim 1, wherein the configuration information further includes location range information used to determine a location area in which to stop performing the cell measurement for a certain period of time based on the location of the non-terrestrial network cell and a location of the UE.

3. The method of claim 1, wherein the determining whether to perform the cell measurement includes determining that the cell measurement operation is performed before the non-terrestrial network cell stops service in a coverage area, based on the configuration information.

4. The method of claim 1, wherein the determining whether to perform the cell measurement includes determining whether the cell measurement operation is performed with respect to at least one of an intra frequency band, an inter frequency band, and an inter radio access technology neighbor cell.

5. The method of claim 1, wherein the determining whether to perform the cell measurement includes determining not to perform the cell measurement operation when the UE is located in a specific area indicated by the configuration information.

6. The method of claim 1, wherein the configuration information is received through system information.

7. The method of claim 6, wherein the system information includes satellite orbit information classified for each cell, and wherein the satellite orbit information is provided to the base station by the inquiry of the base station.

8. The method of claim 1, wherein the determining whether to perform the cell measurement includes determining to perform the cell measurement operation when the UE is located outside a specific area indicated by the configuration information.

9. A method for performing communication using a non-terrestrial network by a base station, the method comprising:
   transmitting configuration information for controlling a cell measurement in the non-terrestrial network to a base station; and
   receiving the cell measurement report operation according to the determination result in which the UE determines whether to perform the cell measurement by using the configuration information, and
   wherein the configuration information comprises skip duration information for stopping the cell measurement for a period of time,
   wherein the skip duration information includes effective time or time range information for skipping the cell measurement in coverage of a non-terrestrial network cell, and
   wherein the effective time or time range information is indicated as a value based on Coordinated Universal Time (UTC).

10. The method of claim 9, wherein the configuration information further includes location range information used to determine a location area in which to stop performing the cell measurement for a certain period of time based on the location of the non-terrestrial network cell and a location of the UE.

11. The method of claim 9, wherein the UE determines whether the cell measurement operation is performed with respect to at least one of an intra frequency band, an inter frequency band, and an inter radio access technology neighbor cell.

12. The method of claim 9, wherein the UE determines not to perform the cell measurement operation when the UE is located in a specific area indicated by the configuration information.

13. The method of claim 9, wherein the configuration information is received through system information.

14. A user equipment (UE) performing communication using a non-terrestrial network, the UE comprising:
   a receiver configured to receive configuration information for controlling a cell measurement in the non-terrestrial network from a base station; and a controller configured to determine whether to perform the cell measurement by using the configuration information and control the cell measurement operation according to the determination result, wherein the configuration information comprises skip duration information for stopping the cell measurement for a period of time, wherein the skip duration information includes effective time or time range information for skipping the cell measurement in coverage of a non-terrestrial network cell, and wherein the effective time or time range information is indicated as a value based on Coordinated Universal Time (UTC).

15. The UE of claim 14, wherein the configuration information further includes location range information used to determine a location area in which to stop performing the cell measurement for a certain period of time based on the location of the non-terrestrial network cell and a location of the UE.

16. The UE of claim 14, wherein the controller is configured to determine whether the cell measurement operation is performed with respect to at least one of an intra frequency band, an inter frequency band, and an inter radio access technology neighbor cell.

17. The UE of claim 14, wherein the controller controls the cell measurement operation not to be performed when the UE is located in a specific area indicated by the configuration information.

18. The UE of claim 14, wherein the configuration information is received through system information.

* * * * *